US011765750B2

(12) United States Patent
Luo et al.

(10) Patent No.: US 11,765,750 B2
(45) Date of Patent: Sep. 19, 2023

(54) METHODS AND APPARATUS FOR DYNAMIC SWITCHING OF UPLINK CONFIGURATIONS

(71) Applicant: QUALCOMM Incorporated, San Diego, CA (US)

(72) Inventors: Jianghong Luo, Skillman, NJ (US); Jing Sun, San Diego, CA (US); Xiaoxia Zhang, San Diego, CA (US); Tao Luo, San Diego, CA (US); Navid Abedini, Basking Ridge, NJ (US); Junyi Li, Franklin Park, NJ (US); Luca Blessent, Whitehouse Station, NJ (US); Karl Georg Hampel, Hoboken, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 276 days.

(21) Appl. No.: 17/219,439

(22) Filed: Mar. 31, 2021

(65) Prior Publication Data
US 2021/0400656 A1 Dec. 23, 2021

Related U.S. Application Data

(60) Provisional application No. 63/040,497, filed on Jun. 17, 2020.

(51) Int. Cl.
*H04W 72/04* (2023.01)
*H04W 72/51* (2023.01)
(Continued)

(52) U.S. Cl.
CPC ............ *H04W 72/51* (2023.01); *H04W 72/21* (2023.01); *H04W 72/044* (2013.01)

(58) Field of Classification Search
CPC ... H04W 72/51; H04W 72/21; H04W 72/044; H04W 72/20; H04W 16/14; H04W 52/146; H04L 5/0048
See application file for complete search history.

(56) References Cited

U.S. PATENT DOCUMENTS

2013/0114562 A1* 5/2013 Seo ..................... H04W 52/146
370/329
2015/0365968 A1* 12/2015 Kim .................. H04W 72/0446
370/280
(Continued)

FOREIGN PATENT DOCUMENTS

WO WO-2021071834 A1 * 4/2021 ......... H04L 27/0006

*Primary Examiner* — Vinncelas Louis
(74) *Attorney, Agent, or Firm* — QUALCOMM Incorporated

(57) ABSTRACT

Methods, systems, and devices for wireless communications are described. A user equipment (UE) may receive, from a base station, control signaling indicating a first uplink configuration including a first set of resources for uplink transmissions over a carrier and a second uplink configuration including a second set of resources for uplink transmissions over the carrier, where the second set of resources are different from the first set of resources. The UE may transmit, to the base station, a first uplink transmission via the carrier according to the first uplink configuration. The UE may then transmit, to the base station an in accordance with an initiation of a channel occupancy time (COT) for the carrier, a second uplink transmission via the carrier according to the second uplink configuration.

30 Claims, 17 Drawing Sheets

(51) Int. Cl.
*H04W 72/21* (2023.01)
*H04W 72/044* (2023.01)

(56) References Cited

U.S. PATENT DOCUMENTS

2019/0182826 A1* 6/2019 Yerramalli ............ H04L 5/0048
2020/0322982 A1* 10/2020 Wu ....................... H04W 16/14

* cited by examiner

METHODS AND APPARATUS FOR DYNAMIC SWITCHING OF UPLINK CONFIGURATIONS

CROSS REFERENCE

The present application for patent claims the benefit of U.S. Provisional Patent application No. 63/040,497 by LUO et al., entitled "TECHNIQUES FOR DYNAMIC SWITCH OF UPLINK CONFIGURATIONS," filed Jun. 17, 2020, assigned to the assignee hereof, and expressly incorporated by reference herein.

FIELD OF TECHNOLOGY

The following relates generally to wireless communications and more specifically to techniques for dynamic switching of uplink configurations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In the context of unlicensed spectrum (e.g., NR-U), a UE may be configured to monitor carriers of the unlicensed spectrum to see if the carriers are free for the UE to use. The UE may perform a channel access procedure in which the UE monitors and evaluates a channel or carrier. Based on performing the channel access procedure, the UE may determine that a given carrier is idle for a preconfigured duration of time (e.g., a preconfigured quantity of sensing slots) and thus free to access, and may begin transmitting over the carrier in order to acquire (e.g., claim) use of the carrier and initiate a channel occupancy time (COT). However, in some cases, other UEs, base stations, or other devices sharing the channel, may attempt to claim and win access to the channel prior to or within the UE transmission (e.g., COT) despite the UE performing the channel access procedure.

SUMMARY

The present disclosure relates to methods, systems, devices, and apparatuses that support techniques for dynamic switching of uplink configurations. Generally, the described techniques provide for dynamically switching uplink configurations in order to improve initiation of channel occupancy times (COTs) in unlicensed spectrum bands. In particular, a user equipment (UE) may be configured to perform uplink transmissions according to a first uplink configuration which exhibits more frequent uplink occasions, and a second uplink configuration which exhibits less frequent uplink occasions. The first uplink configuration may be used by the UE when the UE is outside of a COT, or when the UE is attempting to initiate a COT and claim use of a carrier in an unlicensed or shared channel. In some aspects, the more frequent uplink occasions of the first uplink configuration may enable the UE to transmit an uplink transmission, and thereby establish access to the channel, as soon as possible after passing the criteria for access to the channel. Comparatively, once the UE has won use of the channel and is operating within a COT, less frequent uplink occasions may be sufficient. Accordingly, the second uplink configuration with less frequent uplink occasions may be used while the UE is operating within a COT. In some cases, the UE may identify indications to switch between the first and second uplink configurations by identifying an initiation and/or termination of the COT. Additionally or alternatively, the UE may identify indications to switch between the first and second uplink configurations based on a timer, medium access control (MAC) control element (MAC-CE) messaging, uplink control information (UCI), downlink control information (DCI), or any combination thereof. Dynamically switching between the first uplink configuration and the second uplink configuration may enable a UE to transmit an uplink transmission quickly after passing use criteria for a channel, while also increasing a quantity of wireless devices which may be supported by the unlicensed spectrum.

A method of wireless communication implemented by a UE is described. The method may include identifying a first uplink configuration including a first set of resources for uplink transmissions over a carrier and a second uplink configuration including a second set of resources for uplink transmissions over the carrier, where the second set of resources are different from the first set of resources, transmitting, to a base station, a first uplink transmission via the carrier according to the first uplink configuration, identifying an initiation of a COT for the carrier, and transmitting, to the base station, a second uplink transmission via the carrier according to the second uplink configuration.

An apparatus for wireless communication implemented by a UE is described. The apparatus may include a processor, memory coupled with the processor, and instructions stored in the memory. The instructions may be executable by the processor to cause the apparatus to identify a first uplink configuration including a first set of resources for uplink transmissions over a carrier and a second uplink configuration including a second set of resources for uplink transmissions over the carrier, where the second set of resources are different from the first set of resources, transmit, to a base station, a first uplink transmission via the carrier according to the first uplink configuration, identify an initiation of a COT for the carrier, and transmit, to the base station, a second uplink transmission via the carrier according to the second uplink configuration.

Another apparatus for wireless communication implemented by a UE is described. The apparatus may include means for identifying a first uplink configuration including a first set of resources for uplink transmissions over a carrier and a second uplink configuration including a second set of resources for uplink transmissions over the carrier, where the second set of resources are different from the first set of resources, transmitting, to a base station, a first uplink transmission via the carrier according to the first uplink configuration, identifying an initiation of a COT for the carrier, and transmitting, to the base station, a second uplink transmission via the carrier according to the second uplink configuration.

A non-transitory computer-readable medium storing code for wireless communication implemented by a UE is described. The code may include instructions executable by a processor to identify a first uplink configuration including a first set of resources for uplink transmissions over a carrier and a second uplink configuration including a second set of resources for uplink transmissions over the carrier, where the second set of resources are different from the first set of resources, transmit, to a base station, a first uplink transmission via the carrier according to the first uplink configuration, identify an initiation of a COT for the carrier, and transmit, to the base station, a second uplink transmission via the carrier according to the second uplink configuration.

Some examples of the method, apparatuses, and non-transitory computer-readable medium described herein may further include operations, features, means, or instructions for performing a channel access procedure for the carrier, and initiating the COT for the carrier based on performing the channel access procedure, where identifying the initiation of the COT may be based on initiating the COT.

Some examples of the method, apparatuses, and non-transitory computer-readable medium described herein may further include operations, features, means, or instructions for receiving, from the base station, a downlink transmission including an indication that the base station may have initiated the COT, where identifying the initiation of the COT may be based on receiving the downlink transmission.

Some examples of the method, apparatuses, and non-transitory computer-readable medium described herein may further include operations, features, means, or instructions for receiving, from the base station, a downlink transmission including an indication for the UE to perform uplink transmissions according to the second uplink configuration, where transmitting the second uplink transmission according to the second uplink configuration may be based on receiving the downlink transmission.

Some examples of the method, apparatuses, and non-transitory computer-readable medium described herein may further include operations, features, means, or instructions for receiving, from the base station, a radio resource control (RRC) message indicating the first uplink configuration and the second uplink configuration, where identifying the first uplink configuration and the second uplink configuration may be based on receiving the RRC message.

In some examples of the method, apparatuses, and non-transitory computer-readable medium described herein, the first set of resources include a first set of uplink transmission occasions for uplink transmissions, and the second set of resources include a second set of uplink transmission occasions for uplink transmissions.

In some examples of the method, apparatuses, and non-transitory computer-readable medium described herein, the first set of uplink transmission occasions may be arranged according to a first periodicity, and the second set of uplink transmission occasions may be arranged according to a second periodicity which may be less than the first periodicity.

In some examples of the method, apparatuses, and non-transitory computer-readable medium described herein, the first set of uplink transmission occasions include two or more uplink transmission occasions per slot, and the second set of uplink transmission occasions include one or fewer uplink transmission occasions per slot.

Some examples of the method, apparatuses, and non-transitory computer-readable medium described herein may further include operations, features, means, or instructions for determining an indication to perform uplink transmissions according to the first uplink configuration after transmitting the second uplink transmission, and transmitting, to the base station, a third uplink transmission according to the first uplink configuration based on identifying the indication to perform uplink transmissions according to the first uplink configuration.

Some examples of the method, apparatuses, and non-transitory computer-readable medium described herein may further include operations, features, means, or instructions for identifying a termination of the COT for the carrier, where determining the indication to perform uplink transmissions according to the first uplink configuration may be based on identifying the termination of the COT.

Some examples of the method, apparatuses, and non-transitory computer-readable medium described herein may further include operations, features, means, or instructions for identifying an expiration of a timer associated with the second uplink configuration, where determining the indication to perform uplink transmissions according to the first uplink configuration may be based on identifying the expiration of the timer.

Some examples of the method, apparatuses, and non-transitory computer-readable medium described herein may further include operations, features, means, or instructions for identifying an initiation of the timer based on identifying the initiation of the COT, a downlink message received from the base station, or both, where identifying the expiration of the timer may be based on identifying the initiation of the timer and a timer expiry time.

Some examples of the method, apparatuses, and non-transitory computer-readable medium described herein may further include operations, features, means, or instructions for receiving, from the base station, downlink control information indicating for the UE to perform uplink transmissions according to the first uplink configuration, where determining the indication to perform uplink transmissions according to the first uplink configuration may be based on receiving the downlink control information.

Some examples of the method, apparatuses, and non-transitory computer-readable medium described herein may further include operations, features, means, or instructions for transmitting, to the base station, uplink control information indicating that the UE will perform subsequent uplink transmissions according to the first uplink configuration, where the third uplink transmission may be transmitted based on transmitting the uplink control information.

Some examples of the method, apparatuses, and non-transitory computer-readable medium described herein may further include operations, features, means, or instructions for transmitting a first MAC-CE message, receiving a second MAC-CE message, or both, where the first MAC-CE message and the second MAC-CE message include an indication for the UE to perform subsequent uplink transmissions according to the first uplink configuration, where transmitting the third uplink transmission may be based on transmitting the first MAC-CE message, receiving the second MAC-CE message, or both.

Some examples of the method, apparatuses, and non-transitory computer-readable medium described herein may further include operations, features, means, or instructions for transmitting, to the base station, a UE capability message including an indication that the UE may be configured to perform uplink transmissions according to the first uplink configuration, the second uplink configuration, or both, where transmitting at least one of the first uplink transmission or the second uplink transmission may be based on transmitting the UE capability message.

In some examples of the method, apparatuses, and non-transitory computer-readable medium described herein, at least one of the first uplink transmission or the second uplink transmission includes a scheduling request transmitted via a physical uplink control channel.

In some examples of the method, apparatuses, and non-transitory computer-readable medium described herein, at least one of the first uplink transmission or the second uplink transmission may be transmitted according to a configured grant via a physical uplink shared channel.

In some examples of the method, apparatuses, and non-transitory computer-readable medium described herein, the carrier and the COT may be associated with an unlicensed spectrum band.

A method of wireless communication implemented by a base station is described. The method may include identifying a first uplink configuration including a first set of resources for uplink transmissions over a carrier and a second uplink configuration including a second set of resources for uplink transmissions over the carrier, where the second set of resources are different from the first set of resources, receiving, from a UE, a first uplink transmission via the carrier according to the first uplink configuration, identifying an initiation of a COT for the carrier, and receiving, from the UE, a second uplink transmission via the carrier according to the second uplink configuration.

An apparatus for wireless communication implemented by a base station is described. The apparatus may include a processor, memory coupled with the processor, and instructions stored in the memory. The instructions may be executable by the processor to cause the apparatus to identify a first uplink configuration including a first set of resources for uplink transmissions over a carrier and a second uplink configuration including a second set of resources for uplink transmissions over the carrier, where the second set of resources are different from the first set of resources, receive, from a UE, a first uplink transmission via the carrier according to the first uplink configuration, identify an initiation of a COT for the carrier, and receive, from the UE, a second uplink transmission via the carrier according to the second uplink configuration.

Another apparatus for wireless communication implemented by a base station is described. The apparatus may include means for identifying a first uplink configuration including a first set of resources for uplink transmissions over a carrier and a second uplink configuration including a second set of resources for uplink transmissions over the carrier, where the second set of resources are different from the first set of resources, receiving, from a UE, a first uplink transmission via the carrier according to the first uplink configuration, identifying an initiation of a COT for the carrier, and receiving, from the UE, a second uplink transmission via the carrier according to the second uplink configuration.

A non-transitory computer-readable medium storing code for wireless communication implemented by a base station is described. The code may include instructions executable by a processor to identify a first uplink configuration including a first set of resources for uplink transmissions over a carrier and a second uplink configuration including a second set of resources for uplink transmissions over the carrier, where the second set of resources are different from the first set of resources, receive, from a UE, a first uplink transmission via the carrier according to the first uplink configuration, identify an initiation of a COT for the carrier, and receive, from the UE, a second uplink transmission via the carrier according to the second uplink configuration.

Some examples of the method, apparatuses, and non-transitory computer-readable medium described herein may further include operations, features, means, or instructions for performing a channel access procedure for the carrier, and initiating the COT for the carrier based on performing the channel access procedure, where identifying the initiation of the COT may be based on initiating the COT.

Some examples of the method, apparatuses, and non-transitory computer-readable medium described herein may further include operations, features, means, or instructions for receiving, from the UE, an indication that the UE may have initiated the COT, where identifying the initiation of the COT may be based on receiving the indication.

Some examples of the method, apparatuses, and non-transitory computer-readable medium described herein may further include operations, features, means, or instructions for transmitting, to the UE, a downlink transmission including an indication for the UE to perform uplink transmissions according to the second uplink configuration, where receiving the second uplink transmission according to the second uplink configuration may be based on transmitting the downlink transmission.

Some examples of the method, apparatuses, and non-transitory computer-readable medium described herein may further include operations, features, means, or instructions for transmitting, to the UE, an RRC message indicating the first uplink configuration and the second uplink configuration based on identifying the first uplink configuration and the second uplink configuration.

In some examples of the method, apparatuses, and non-transitory computer-readable medium described herein, the first set of resources include a first set of uplink transmission occasions for uplink transmissions, and the second set of resources include a second set of uplink transmission occasions for uplink transmissions.

In some examples of the method, apparatuses, and non-transitory computer-readable medium described herein, the first set of uplink transmission occasions may be arranged according to a first periodicity, and the second set of uplink transmission occasions may be arranged according to a second periodicity which may be less than the first periodicity.

In some examples of the method, apparatuses, and non-transitory computer-readable medium described herein, the first set of uplink transmission occasions include two or more uplink transmission occasions per slot, and the second set of uplink transmission occasions include one or fewer uplink transmission occasions per slot.

Some examples of the method, apparatuses, and non-transitory computer-readable medium described herein may further include operations, features, means, or instructions for determining an indication to receive uplink transmissions according to the first uplink configuration after transmitting the second uplink transmission, and receiving, from the UE, a third uplink transmission according to the first uplink configuration based on identifying the indication to receive uplink transmissions according to the first uplink configuration.

Some examples of the method, apparatuses, and non-transitory computer-readable medium described herein may further include operations, features, means, or instructions for identifying a termination of the COT for the carrier, where determining the indication to receive uplink transmissions according to the first uplink configuration may be based on identifying the termination of the COT.

Some examples of the method, apparatuses, and non-transitory computer-readable medium described herein may further include operations, features, means, or instructions for identifying an expiration of a timer associated with the second uplink configuration, where determining the indication to receive uplink transmissions according to the first uplink configuration may be based on identifying the expiration of the timer.

Some examples of the method, apparatuses, and non-transitory computer-readable medium described herein may further include operations, features, means, or instructions for identifying an initiation of the timer based on identifying the initiation of the COT, an uplink message received from the UE, or both, where identifying the expiration of the timer may be based on identifying the initiation of the timer and a timer expiry time.

Some examples of the method, apparatuses, and non-transitory computer-readable medium described herein may further include operations, features, means, or instructions for transmitting, to the UE, downlink control information indicating for the UE to perform uplink transmissions according to the first uplink configuration based on determining the indication to receive uplink transmissions according to the first uplink configuration.

Some examples of the method, apparatuses, and non-transitory computer-readable medium described herein may further include operations, features, means, or instructions for receiving, from the UE, uplink control information indicating that the UE will perform subsequent uplink transmissions according to the first uplink configuration, where the third uplink transmission may be received based on receiving the uplink control information.

Some examples of the method, apparatuses, and non-transitory computer-readable medium described herein may further include operations, features, means, or instructions for receiving a first MAC-CE message, transmitting a second MAC-CE message, or both, where the first MAC-CE message and the second MAC-CE message include an indication for the UE to perform subsequent uplink transmissions according to the first uplink configuration, where receiving the third uplink transmission may be based on receiving the first MAC-CE message, transmitting the second MAC-CE message, or both.

Some examples of the method, apparatuses, and non-transitory computer-readable medium described herein may further include operations, features, means, or instructions for receiving, from the UE, a UE capability message including an indication that the UE may be configured to perform uplink transmissions according to the first uplink configuration, the second uplink configuration, or both, where receiving at least one of the first uplink transmission or the second uplink transmission may be based on receiving the UE capability message.

In some examples of the method, apparatuses, and non-transitory computer-readable medium described herein, at least one of the first uplink transmission or the second uplink transmission includes a scheduling request transmitted via a physical uplink control channel.

In some examples of the method, apparatuses, and non-transitory computer-readable medium described herein, at least one of the first uplink transmission or the second uplink transmission may be received according to a configured grant via a physical uplink shared channel.

In some examples of the method, apparatuses, and non-transitory computer-readable medium described herein, the carrier and the COT may be associated with an unlicensed spectrum band.

DETAILED DESCRIPTION

Figure 1:
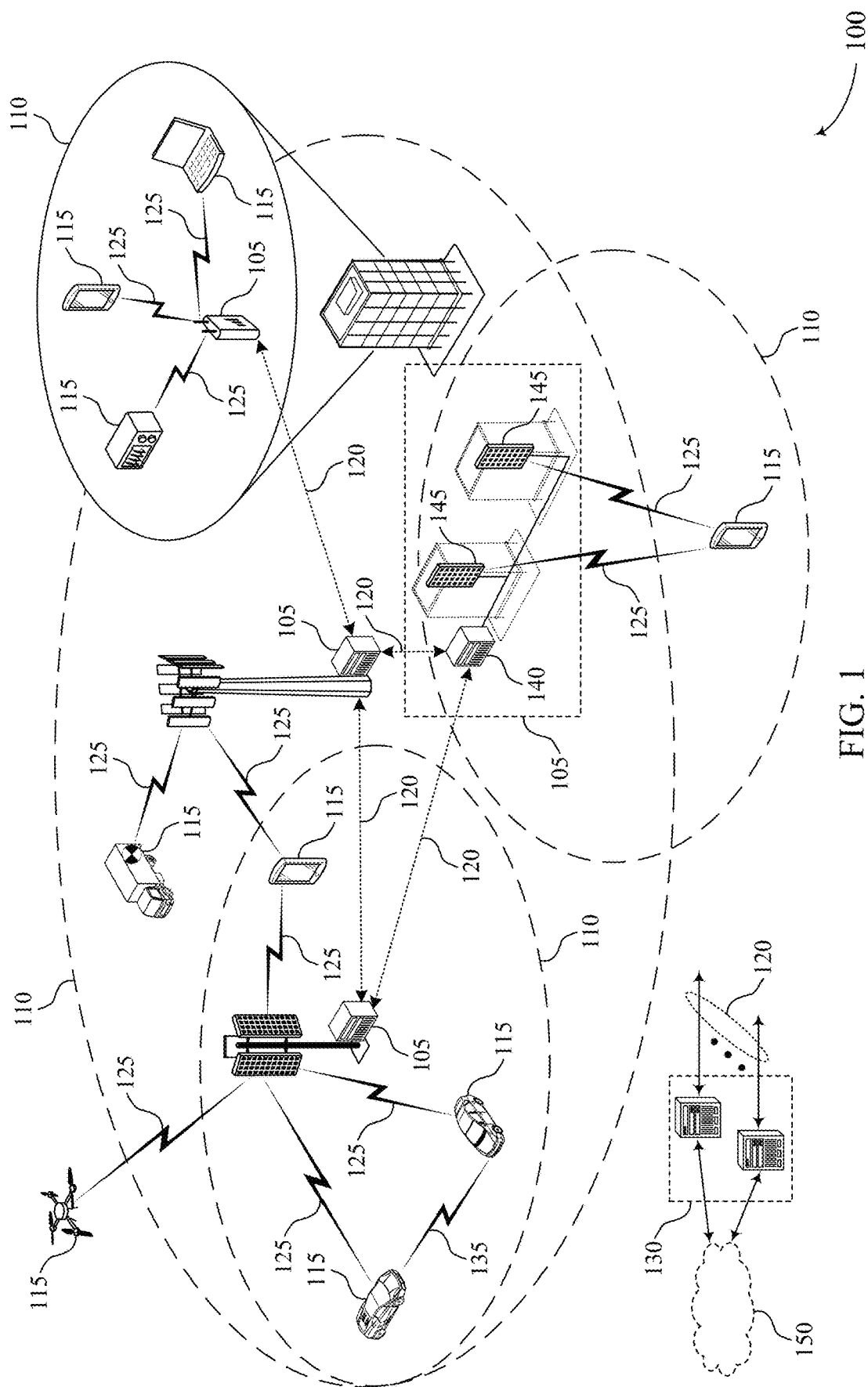
FIG. 1 illustrates an example of a system for wireless communications that supports techniques for dynamic switching of uplink configurations in accordance with aspects of the present disclosure.

In the context of unlicensed spectrum (e.g., NR-U), user equipment (UE) may be configured to perform a channel access procedure in which the UE monitors and evaluates channels of the unlicensed spectrum to see if the channels are free for the UE to use. If a given channel is determined to be idle for a preconfigured duration of time (e.g., a preconfigured quantity of sensing slots) based on performing the channel access procedure, the UE may determine the carrier is free to access and may begin transmitting over a carrier associated with the channel in order to acquire (e.g., claim use of) the channel and initiate a channel occupancy time (COT). In the context of unlicensed spectrum, other UEs or base stations may still attempt to claim use of the channel after the UE completes the channel access procedure and prior to actual transmission by the UE. Accordingly, it is desirable to transmit uplink transmissions as soon as possible after performing the channel access procedure (e.g., after initiating the COT) in order to effectively "win" use of the carrier and the initiated COT. The more time between performing the channel access procedure and transmitting over the carrier, the higher the probability another wireless device (e.g., UE, base station) will claim/win use of the carrier over the UE.

To address issues associated with claiming use of carriers within unlicensed spectrum, a UE may be configured to perform uplink transmissions according to a first uplink configuration which exhibits more frequent uplink occasions, and a second uplink configuration which exhibits less frequent uplink occasions. The first uplink configuration may be used by the UE when the UE is outside of a COT, or when the UE is attempting to initiate a COT and claim use of an unlicensed channel. In some aspects, the more frequent uplink occasions of the first uplink configuration may enable the UE to transmit an uplink transmission, and thereby win use of the channel, as soon as possible after claiming use of the channel (e.g., as soon as possible after successfully completing a channel access procedure for the channel). Comparatively, once the UE has won use of the channel and is operating within a COT, less frequent uplink occasions may be sufficient. Accordingly, the second uplink configuration with less frequent uplink occasions may be used while the UE is operating within a COT.

In some cases, the UE may identify indications to switch between the first and second uplink configurations by identifying an initiation and/or termination of the COT. Additionally or alternatively, the UE may identify indications to switch between the first and second uplink configurations based on a timer, medium access control (MAC) control element (MAC-CE) messaging, uplink control information (UCI), downlink control information (DCI), or any combination thereof. The first uplink configuration with more frequent uplink occasions described herein may allow a UE to transmit an uplink transmission quickly after claiming use of a channel, and reduce the likelihood that another wireless device will win use of the channel over the UE. Moreover, by providing a second uplink transmission with less frequent uplink occasions, available resources within the channel and/or unlicensed spectrum may be increased, thereby reducing potential for interference and increasing a quantity of wireless devices which may be supported by the unlicensed spectrum.

Aspects of the disclosure are initially described in the context of wireless communications systems. Aspects of the disclosure are additionally described in the context of an example timing diagram and an example process flow. Aspects of the disclosure are further illustrated by and described with reference to apparatus diagrams, system diagrams, and flowcharts that relate to techniques for enhanced coverage configured grant.

FIG. 1 illustrates an example of a wireless communications system 100 that supports techniques for dynamic switching of uplink configurations in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. In one aspect, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. In one aspect, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, in some aspects, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, in some aspects, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. In one aspect, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, in some aspects, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. In one aspect, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. In one aspect, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. In one aspect, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. In one aspect, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. In one aspect, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. In one aspect, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. In one aspect, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UEs 115 and the base stations 105 of the wireless communications system 100 may support communications for dynamically switching between two or more uplink configurations. In particular, a UE 115 of the wireless communications system 100 may support a first uplink configuration which may be used be while the UE 115 is outside a COT or when the UE 115 is attempting to initiate a COT, and a second uplink configuration which may be used while the UE 115 is within a COT. In some aspects, the first uplink configuration may enable the UE 115 to transmit uplink transmissions as soon as possible after claiming use of a channel (e.g., as soon as possible after successfully completing a channel access procedure for the channel), and thereby improve the likelihood that the UE 115 will win access to the channel. Moreover, the second uplink configuration may reduce resource consumption and improve available resources within a carrier and/or unlicensed spectrum, thereby reducing interference and increasing a quantity of wireless devices (e.g., UEs 115, base stations 105) which may be supported by the unlicensed spectrum.

In one aspect, a UE 115 may be configured to perform uplink transmissions according to a first uplink configuration which exhibits more frequent uplink occasions, and a second uplink configuration which exhibits less frequent uplink occasions. The first uplink configuration may be used by the UE 115 when the UE 115 is outside of a COT associated with unlicensed spectrum, or when the UE is attempting to initiate a COT and claim use of a channel within the unlicensed spectrum. In some aspects, the more frequent uplink occasions of the first uplink configuration may enable the UE 115 to transmit an uplink transmission, and thereby win access to the channel, as soon as possible after claiming use of the channel. Accordingly, the first uplink configuration may reduce the likelihood that another wireless device (e.g., another UE 115 or a base station 105) may claim use of the channel and access the channel before the UE 115 actually transmits to establish access to the channel. Comparatively, once the UE 115 has won use of the channel and is operating within a COT, less frequent uplink occasions may be sufficient. Accordingly, the second uplink configuration with less frequent uplink occasions may be used while the UE 115 is operating within a COT.

In some aspects, wireless communications system 100 may support techniques and signaling which enable the UE 115 to dynamically switch between the first uplink configuration and the second uplink configuration. In some cases, the UE 115 may identify indications to switch between the first uplink configuration and the second uplink configuration by identifying an initiation and/or termination of the COT. Additionally or alternatively, the UE 115 may identify indications to switch between the first uplink configuration and the second uplink configuration based on a timer, MAC-CE messaging, UCI, DCI, or any combination thereof.

The techniques described herein may enable more efficient and reliable usage of unlicensed spectrum. In particular, the first uplink configuration with more frequent uplink transmission occasions described herein may allow a UE 115 to transmit an uplink transmission quickly after claiming use of a channel, and reduce the likelihood that another wireless device will win use of the channel over the UE 115. Moreover, by providing a second uplink configuration with less frequent uplink transmission occasions, available resources within the channel and/or unlicensed spectrum may be increased, thereby reducing potential for interference and increasing a quantity of wireless devices which may be supported by the unlicensed spectrum.

Figure 2:
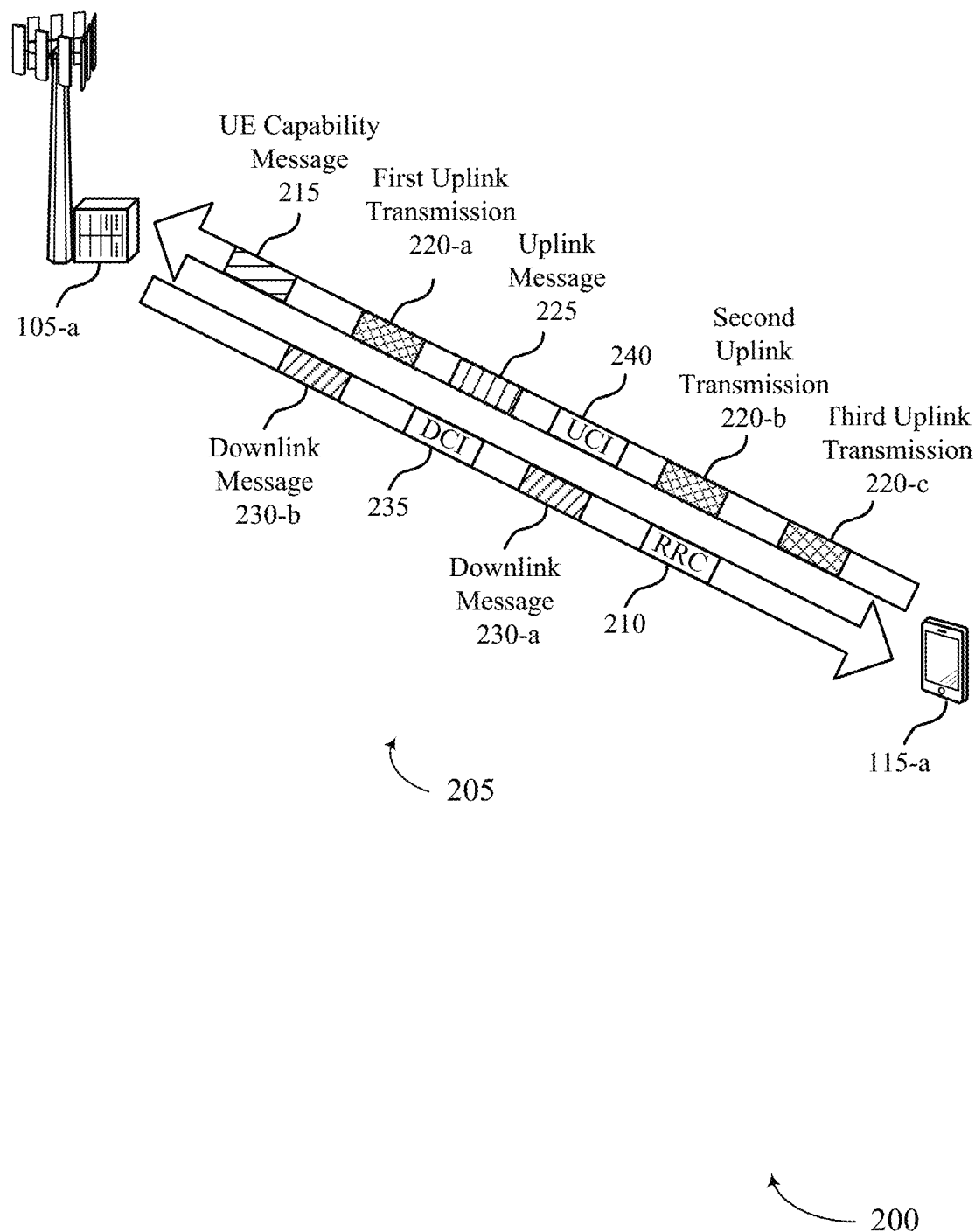
FIG. 2 illustrates an example of a wireless communications system that supports techniques for dynamic switching of uplink configurations in accordance with aspects of the present disclosure.

FIG. 2 illustrates an example of a wireless communications system 200 that supports techniques for dynamic switching of uplink configurations in accordance with aspects of the present disclosure. In some aspects, wireless communications system 200 may implement aspects of wireless communications system 100. The wireless communications system 200 may include a base station 105-*a* and a UE 115-*a*, which may be examples of UE 115 and base stations 105, as described with reference to FIG. 1.

The UE 115-*a* may communicate with the base station 105-*a* using a communication link 205. In some cases, the communication link 205 may include an example of an access link (e.g., a Uu link). In some cases, the communication link 205 may include an example of a unicast channel between the base station 105-*a* and the UE 115-*a*. The communication link 205 may include a bi-directional link that can include both uplink and downlink communication. In one aspect, the UE 115-*a* may transmit uplink transmissions, such as uplink messages or uplink signals, to the base station 105-*a* using the communication link 205 and the base station 105-*a* may transmit downlink transmissions, such as downlink messages or downlink signals, to the UE 115-*a* using the communication link 205.

The UE 115-*a* and the base station 105-*a* of the wireless communications system 200 may support communications for dynamically switching between two or more uplink configurations. In particular, the UE 115-*a* of the wireless communications system 200 may support a first uplink configuration which may be used while the UE 115-*a* is outside a COT of an unlicensed spectrum, or when the UE 115-*a* is attempting to initiate a COT, and a second uplink configuration which may be used while the UE 115-*a* is within a COT. In some cases, the UE 115-*a* may be configured to support more than two uplink configurations. In some aspects, the first uplink configuration may enable the UE 115-*a* to transmit uplink transmissions as soon as possible after claiming use of a carrier (e.g., as soon as possible after successfully completing a channel access procedure for the carrier), and thereby improve the likelihood that the UE 115-*a* will win use of the carrier. Moreover, the second uplink configuration may reduce resource consumption and improve available resources within a carrier and/or unlicensed spectrum, thereby reducing interference and increasing a quantity of wireless devices (e.g., UEs 115, base stations 105) which may be supported by the unlicensed spectrum.

In some aspects, the UE 115-*a* may transmit a UE capability message 210 to the base station 105-*a*. The UE capability message 210 may include an indication that the UE 115-*a* is configured to perform uplink transmissions according to the first uplink configuration, the second uplink configuration, or both. In this regard, the UE capability message 210 may include an indication that the UE 115-*a* supports dynamically switching between the first uplink configuration and the second uplink configuration. In additional or alternative cases, the UE 115-*a* may refrain from transmitting the UE capability message 210. In such cases, the base station 105-*a* may be configured to determine (e.g., assume) that the UE 115-*a* does or does not support a dynamic switch of uplink configurations.

In some aspects, the base station 105-*a* may transmit control signaling (e.g., a radio resource control (RRC) message 215) including an indication of one or more uplink configurations associated with the UE 115-*a*. In some aspects, the base station 105-*a* may transmit an RRC message 215 including an indication of a first uplink configuration and a second uplink configuration associated with the UE 115-*a*. In one aspect, the RRC message 215 may include an indication of the first uplink configuration and the second uplink configuration in cases where the UE 115-*a* indicates to the base station 105-*a* (e.g., via the UE capability message 210) that it supports dynamically switching between the first uplink configuration and the second uplink configuration. In this regard, the base station 105-*a* may determine the first uplink configuration and the second uplink configuration for a carrier associated with an unlicensed spectrum band based on the UE capability message 210, and transmit the RRC message 215 based on identifying the respective uplink configurations.

In some aspects, the first uplink configuration may include a first set of resources for uplink transmissions over a carrier (e.g., uplink transmissions over the communication link 205). Similarly, the second uplink configuration may include a second set of resources for uplink transmissions over the carrier, where the second set of uplink resources are different from the first set of uplink resources. In some aspects, the first and second sets of uplink resources may each include a set of time resources and a set of frequency resources. In some aspects, the first set of resources may include a first set of uplink transmission occasions for uplink transmissions, and the second set of resources may include a second set of uplink transmission occasions for uplink transmissions. For the purposes of the present disclosure, the term "uplink transmission occasions" may refer to a set of resources (or a subset of resources) which are allocated for the UE 115-a to transmit uplink transmissions. In some cases, the first set of uplink transmission occasions are arranged according to a first periodicity, and the second set of uplink transmission occasions are arranged according to a second periodicity which is less than the first periodicity. For instance, the first set of uplink transmission occasions may include two or more uplink transmission occasions per slot, and the second set of uplink transmission occasions may include one or fewer uplink transmission occasions per slot. In this regard, the first uplink configuration may include more numerous and more frequent uplink transmission occasions.

The UE 115-a may identify the first uplink configuration and the second uplink configuration. In this regard, the UE 115-a may identify the first set of resources associated with the first uplink configuration, and the second set of resources associated with the second uplink configuration. In some cases, the UE 115-a may identify the first uplink configuration and the second uplink configuration based on the RRC message 215 received from the base station 105-a. Additionally or alternatively, the UE 115-a may identify the first uplink configuration and the second uplink configuration without any indication from the base station 105-a. For instance, in some cases, the UE 115-a may be preconfigured with the first uplink configuration and the second uplink configuration.

In some cases, the UE 115-a, the base station 105-a, or both, may perform a channel access procedure in which the UE 115-a monitors and evaluates a channel or carrier associated with the unlicensed spectrum. In this regard, the UE 115-a and/or the base station 105-a may perform the channel access procedure in an attempt to claim use of the channel. In some aspects, the UE 115-a, the base station 105-a, or both, may monitor and evaluate the channel as part of the channel access procedure in order to determine whether the channel is free to access. In some aspects, the UE 115-a and/or the base station 105-a may determine the channel is free to access if, through the channel access procedure, the UE 115-a and/or base station 105-a determines that the channel is idle for a preconfigured duration of time (e.g., a preconfigured quantity of sensing slots). In one aspect, a channel may be determined to be free to access according to a first type of channel access procedure for NR-U (e.g., Type 1 channel access procedure) if the channel is idle for a random quantity of sensing slots. In this example, the UE 115-a and/or the base station 105-a may transmit and acquire the channel after successfully completing the Type 1 channel access procedure with a random quantity of sensing slots.

In some aspects, a channel may be determined to be free to access according to additional types of channel access procedures if the channel is idle for a certain fixed period of time, (e.g., 25 µs for a Type 2A channel access procedure, 16 µs for a Type 2B channel access procedure). In this example, the UE 115-a and/or the base station 105-a may transmit and acquire the channel after successfully completing the Type 2A or 2B channel access procedures with the predefined quantities of sensing slots. Additionally or alternatively, the UE 115-a and/or the base station 105-a may not be required to perform a channel access procedure (e.g., perform channel access sensing) before transmission if a gap between two transmissions is less than a certain fixed period of time, (e.g., 16 µs) within a COT (e.g., Type 2C channel access procedure).

In some aspects, the UE 115-a may transmit a first uplink transmission 220-a via a carrier according to (e.g., using) the first uplink configuration. In this regard, the UE 115-a may transmit the first uplink transmission 220-a using the first set of resources associated with the first uplink configuration. The UE 115-a may transmit the first uplink transmission 220-a based on the transmitting the UE capability message 210, receiving the RRC message 215, identifying the first and second uplink configurations, or any combination thereof. In some cases, the first uplink transmission 220-a may include a scheduling request. The scheduling request may be transmitted via a physical uplink control channel (PUCCH), and may indicate a request for an uplink grant from the base station 105-a. Additionally or alternatively, the first uplink transmission 220-a may include data transmitted via a physical uplink shared channel (PUSCH) according to a grant (e.g., configured grant, RRC-configured grant, dynamic grant).

In some aspects, the UE 115-a may transmit the first uplink transmission 220-a while the UE 115-a is not operating within a COT. Additionally or alternatively, the UE 115-a may transmit the first uplink transmission 220-a after passing the channel access procedure. As noted previously herein, it may be beneficial to perform an uplink transmission (e.g., first uplink transmission 220-a) as soon as possible after successful completion of the channel access procedure in order to win use of the channel and prevent other wireless devices from winning use of the carrier over the UE 115-a. Accordingly, in some cases, the UE 115-a may transmit the first uplink transmission 220-a using the first uplink transmission occasion within the first uplink configuration which follows successful completion of the channel access procedure. In cases where the first uplink configuration includes uplink transmission occasions spaced at a frequent periodicity (e.g., two or more uplink transmission occasions per slot), the first uplink configuration may enable the UE 115-a to transmit the first uplink transmission 220-a quickly following the successful completion of the channel access procedure. In this regard, the first uplink configuration may reduce the likelihood that another wireless device will win use of the channel over the UE 115-a (e.g., after the UE has successfully completed the channel access procedure but prior to transmission).

In some aspects, the UE 115-a, the base station 105-a, or both, may identify initiation of a COT for the channel. The COT may be associated with the channel of the unlicensed spectrum band. In cases where the UE 115-a performs the channel access procedure, the UE 115-a may additionally initiate the COT for the channel based on performing the channel access procedure. In such cases, the UE 115-a may identify the initiation of the COT based on performing the channel access procedure, initiating the COT, or both. Similarly, in cases where the base station 105-a performs the channel access procedure, the base station 105-a may additionally initiate the COT for the channel based on performing the channel access procedure. In such cases, the base station 105-a may identify the initiation of the COT based on performing the channel access procedure, initiating the COT, or both.

In cases where the base station 105-a performed the channel access procedure and/or initiated the COT, the base station 105-a may transmit a downlink message 230-a to the UE 115-a, where the downlink message 230-a indicates that the base station 105-a performed the channel access procedure, initiated the COT, or both. For instance, in cases where the base station 105-a performs the channel access procedure and/or initiates the COT, the base station 105-a may transmit a downlink message 230-*a* indicating that the base station 105-*a* initiated the COT, and the UE 115-*a* may identify the initiation of the COT based on the downlink message 230-*a* received from the base station 105-*a*. In additional or alternative aspects, the base station 105-*a* may transmit DCI 235 (e.g., DCI2_0) to the UE 115-*a*, where the DCI 235 indicates that the base station 105-*a* performed the channel access procedure, initiated the COT, or both. In this regard, the UE 115-*a* may be configured to determine that it is operating within a COT initiate by the base station 105-*a* based on the downlink message 230-*a*, DCI 235, or both.

Conversely, in cases where the UE 115-*a* performs the channel access procedure and/or initiates the COT, the UE 115-*a* may transmit an uplink message 225 indicating that the UE 115-*a* initiated the COT, and the base station 105-*a* may identify the initiation of the COT based on the uplink message received from the UE 115-*a*. In additional or alternative aspects, the UE 115-*a* may transmit UCI 240 (e.g., a configured grant UCI (CG-UCI)), a scheduling request, or both, to the base station 105-*a*, where the UCI 240 indicates that the UE 115-*a* performed the channel access procedure, initiated the COT, or both. In this regard, the base station 105-*a* may be configured to determine that it is operating within a COT initiate by the UE 115-*a* based on the uplink message 225, UCI 240, scheduling request, or any combination thereof.

In some aspects, the base station 105-*b* may transmit a downlink message 230-*b* to the UE 115-*a*, where the downlink message 230-*b* includes an indication for the UE 115-*a* to perform uplink transmissions 220 according to the second uplink configuration. In some aspects, the base station 105-*a* may transmit the downlink message 230-*b* based on identifying the initiation of the COT. In some aspects, the downlink message 230-*b* may include DCI (e.g., DCI2_0). In some aspects, the DCI (e.g., downlink message 230-*b*) may include a slot format indicator (SFI) which indicates the switch from the first uplink configuration to the second uplink configuration. In particular, a subset of resources of the first set of resources associated with the first uplink configuration may be indicated as being "flexible," and may therefore be deactivated or disabled by the DCI and/or SFI. For instance, the downlink message 230-*b* (e.g., DCI, SFI) may indicate the switch from the first uplink configuration to the second uplink configuration by deactivating or disabling a subset of uplink transmission occasions associated with the first uplink configuration. It is noted herein, however, that disabling resources associated with the first uplink configuration may affect other resources of the first uplink configuration in addition to the uplink transmission occasions.

The UE 115-*a* may transmit a second uplink transmission 220-*b* via the carrier according to (e.g., using) the second uplink configuration. In this regard, the UE 115-*a* may transmit the second uplink transmission 220-*b* using the second set of resources associated with the second uplink configuration. As noted previously herein, the second uplink transmission 220-*b* may include a scheduling request transmitted via a PUCCH. Additionally or alternatively, the second uplink transmission may include data transmitted via PUSCH according to a grant (e.g., configured grant, dynamic grant).

The UE 115-*a* may transmit the second uplink transmission 220-*b* based on transmitting the UE capability message 210, receiving the RRC message 215, identifying the first and second uplink configurations, identifying the initiation of the COT, receiving the downlink message 230-*b* including the indication to perform uplink transmissions according to the second uplink configuration, or any combination thereof. In one aspect, in some cases, the UE 115-*a* may implicitly (e.g., automatically) transmit subsequent uplink transmissions 220 (e.g., the second uplink transmission 220-*b*) according to the second uplink configuration upon identifying that the UE 115-*a* is operating within a COT (e.g., upon identifying the initiation of the COT). In such cases, the UE 115-*a* may transmit the second uplink transmission 220-*b* based on identifying the initiation of the COT.

Additionally or alternatively, the UE 115-*a* may switch from the first uplink configuration to the second uplink configuration based on explicit signaling from the base station 105-*a*. In such cases, the UE 115-*a* may switch to the second uplink configuration and transmit the second uplink transmission 220-*b* according to the second uplink configuration based on the downlink message 230-*a* (e.g., DCI, SFI) including the indication to perform uplink transmissions according to the second uplink configuration.

In some aspects, UE 115-*a*, the base station 105-*a*, or both, may identify an indication to perform (e.g., transmit, receive) subsequent uplink transmissions 220 (e.g., a third uplink transmission 220-*c*) according to (e.g., using) the first uplink configuration. In some cases, the UE 115-*a* and/or the base station 105-*a* may identify the indication to perform uplink transmissions 220 using the first uplink configuration after performing the second uplink transmission 220-*b*. The UE 115-*a*, the base station 105-*a*, or both, may identify the indication to perform uplink transmissions 220 according to the first uplink configuration based on a termination of the COT, an expiration of a timer, MAC-CE messaging, UCI, DCI, or any combination thereof.

In some aspects, the UE 115-*a* and/or the base station 105-*a* may identify a termination of the COT. In some cases, the UE 115-*a* and/or the base station 105-*a* may identify the termination of the COT based on a predetermined duration of the COT, or a predefined termination trigger of the COT. In such cases, the UE 115-*a* and/or the base station 105-*a* may identify the indication to perform uplink transmissions 220 using the first uplink configuration based on identifying the termination of the COT. In this regard, the UE 115-*a* and/or the base station 105-*a* may implicitly (e.g., automatically) perform subsequent uplink transmissions 220 (e.g., a third uplink transmission 220-*c*) according to the first uplink configuration when the respective devices are operating outside of a COT.

In additional or alternative aspects, the UE 115-*a* and/or the base station 105-*a* may identify the indication to perform subsequent uplink transmissions 220 using the first uplink configuration based on an expiration of a timer. In some cases, the timer may be initiated upon initiation of the COT, a downlink message (e.g., downlink message 230-*a* or 230-*b*) transmitted by the base station 105-*b*, an uplink message 225 transmitted by the UE 115-*a*, or any combination thereof. In such cases, the UE 115-*a* and/or the base station 105-*a* may identify the initiation of the timer, and may identify the expiration of the timer based on the initiation of the timer and a timer expiry time. The timer expiry time may be preconfigured, signaled to the UE 115-*a* and/or base station 105-*a*, or both.

In additional or alternative aspects, the UE 115-*a* and/or the base station 105-*a* may identify the indication to perform subsequent uplink transmissions 220 using the first uplink configuration based on DCI received from the base station 105-*a*, UCI received from the UE 115-*a*, or both. In one aspect, the UE 115-*a* may transmit UCI to the base station 105-*a*, where the UCI indicates that the UE 115-*a* will perform subsequent uplink transmissions 220 (e.g., the third uplink transmission 220-*c*) according to the first uplink configuration. In this example, the base station 105-*a* may determine the indication to perform subsequent uplink transmissions 220 (e.g., the third uplink transmission 220-*c*) using the first uplink configuration based on the received UCI. In other aspects, the base station 105-*a* may transmit DCI to the UE 115-*a*, where the DCI indicates for the UE 115-*a* to perform subsequent uplink transmissions 220 according to the first uplink configuration. In this example, the UE 115-*a* may determine the indication to perform subsequent uplink transmissions 220 using the first uplink configuration based on the received DCI.

In additional or alternative aspects, the UE 115-*a* and/or the base station 105-*a* may identify the indication to perform subsequent uplink transmissions 220 using the first uplink configuration based on MAC-CE messaging. In one aspect, the UE 115-*a* may transmit a MAC-CE message to the base station 105-*a*, where the MAC-CE message indicates that the UE 115-*a* will perform subsequent uplink transmissions 220 (e.g., the third uplink transmission 220-*c*) according to the first uplink configuration. In this example, the base station 105-*b* may determine the indication to perform subsequent uplink transmissions 220 using the first uplink configuration based on the received MAC-CE message. In other aspects, the base station 105-*a* may transmit a MAC-CE message to the UE 115-*a*, where the MAC-CE message indicates for the UE 115-*a* to perform subsequent uplink transmissions 220 according to the first uplink transmission. In this example, the UE 115-*a* may determine the indication to perform subsequent uplink transmissions 220 using the first uplink configuration based on the received MAC-CE message.

In some aspects, the UE 115-*a* may transmit the third uplink transmission 220-*c* via the carrier according to (e.g., using) the first uplink configuration. In this regard, the UE 115-*a* may transmit the third uplink transmission 220-*c* using the first set of resources associated with the first uplink configuration. In some cases, the third uplink transmission may include a scheduling request transmitted via a PUCCH. Additionally or alternatively, the third uplink transmission may include data transmitted via PUSCH according to a grant (e.g., configured grant, dynamic grant).

The UE 115-*a* may transmit the third uplink transmission 220-*c* based on transmitting the UE capability message 210, receiving the RRC message 215, identifying the first and second uplink configurations, identifying the indication to perform uplink transmissions using the first uplink configuration, or any combination thereof. In this regard, the UE 115-*a* may transmit the third uplink transmission based on a termination of the COT, an expiration of a timer, MAC-CE messaging, UCI, DCI, or any combination thereof.

It is contemplated herein that the ability to dynamically switch between uplink configurations may enable more efficient and reliable wireless communications both inside and outside of a COT. In particular, the first uplink configuration including a high periodicity of uplink transmission occasions may enable the UE 115-*a* to efficiently claim and win access of an unlicensed channel. However, due to the fact that resources within a COT are multiplexed among multiple UEs 115 in time, frequency, and code domain, the frequent uplink transmissions of the first uplink configuration may result in increases collision probability or a reduced number of supported UEs 115 if used within a COT. In this regard, the ability to utilize the second uplink configuration with less frequent uplink transmission occasions may reduce the probability of collisions within the COT, and increase a number of UEs 115 which are supported by the unlicensed spectrum while maintaining an acceptable collision probability.

Moreover, the less frequent uplink transmission occasions used within a COT enable the base station 105-*a* to leave gaps between allocated slots assigned to UEs 115. This may enable the base station 105-*a* to determine whether or not the UE 115-*a* will transmit an uplink transmission via detection of front-load demodulation reference signal (DMRS), and may enable the base station 105-*a* to reallocate resources for downlink traffic when it does not detect any uplink transmissions from the UE 115-*a*.

Techniques described herein with respect to FIG. 2 are described in the context of a UE 115-*a* and a base station 105-*a*. However, it is contemplated herein that the techniques may be applied to other contexts or networks, such as IAB networks. In the context of an IAB network, the behavior of an IAB-node MT may be similar to that of the UE 115-*a* described with reference to FIG. 2, and the behavior of an IAB-node distributed unit (DU) and IAB-donor central unit (CU) may be similar to that of the base station 105-*a* described with reference to FIG. 2.

The techniques described herein may enable more efficient and reliable usage of unlicensed spectrum. In particular, the first uplink configuration with more frequent uplink transmission occasions described herein may allow the UE 115-*a* to transmit an uplink transmission quickly after claiming use of a channel, and reduce the likelihood that another wireless device will win use of the channel over the UE 115-*a*. Moreover, by providing a second uplink configuration with less frequent uplink transmission occasions, available resources within the c and/or unlicensed spectrum may be increased, thereby reducing potential for interference and increasing a quantity of wireless devices which may be supported by the unlicensed spectrum.

Figure 3:
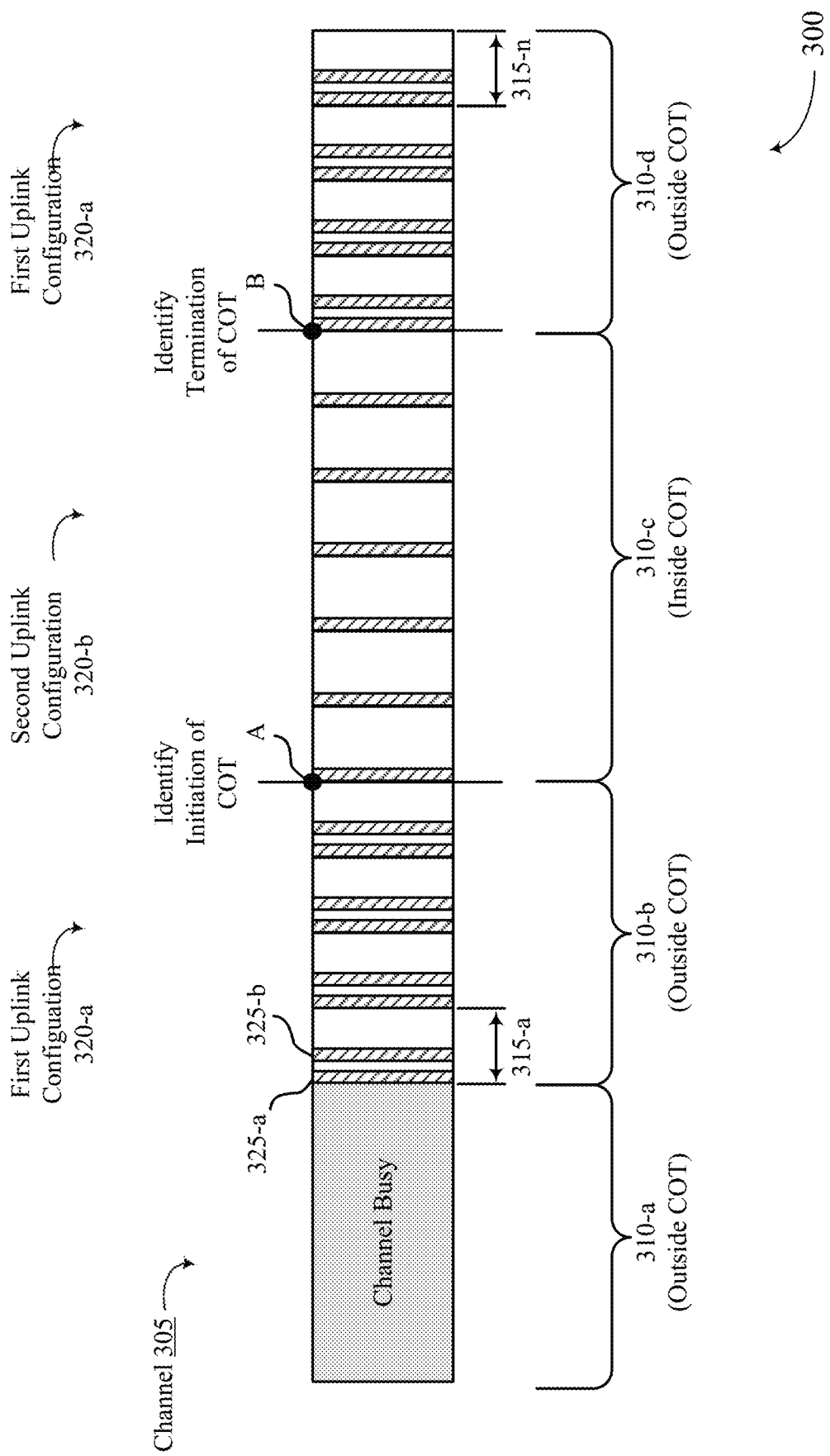
FIG. 3 illustrates an example of a timing diagram that supports techniques for dynamic switching of uplink configurations in accordance with aspects of the present disclosure.

FIG. 3 illustrates an example of a timing diagram 300 that supports techniques for dynamic switching of uplink configurations in accordance with aspects of the present disclosure. In some aspects, timing diagram 300 may implement aspects of wireless communications systems 100 or 200. The timing diagram 300 may illustrate an example timing for dynamically switching between uplink configurations, as described with reference to FIGS. 1-2.

In some aspects, the timing diagram 300 may illustrate resources and timing associated with a channel 305 (e.g., carrier used for communication over the channel) of an unlicensed spectrum. As noted previously herein, wireless devices (e.g., UEs 115, base stations 105) may compete for use of channels associated with unlicensed spectrum. In this regard, the channel 305 illustrated in FIG. 3 may be busy (e.g., occupied) by another wireless device throughout time duration 310-*a*. In some aspects, a UE 115, a base station 105, or both, may perform a channel access procedure in which the UE 115 monitors and evaluates the channel 305. Based on performing the channel access procedure, the UE 115 may determine that the channel 305 is idle for a preconfigured duration of time (e.g., a preconfigured quantity of sensing slots 315). In such cases, the UE 115 may determine the channel 305 (or a carrier associated with the channel 305) is free to access, and may begin transmitting over the carrier associated with the channel 305 in order to acquire (e.g., claim use of) the channel an initiate a COT.

In some aspects, a channel access procedure may be performed by a UE 115 throughout all or at least portions of time durations 310-*a* and 310-*b*. In this regard, the UE 115 may monitor the channel 305 for all or at least a portion of time durations 310-*a* and 310-*b* to determine if the channel is free to access. Accordingly, the UE 115 may be operating outside of a COT for all or at least portions of time durations 310-*a* and 310-*b*.

In some aspects, the UE 115 and/or base station 105 may successfully complete the channel access procedure at some time prior to Time A. In this regard, the UE 115 and/or base station 105 may monitor the channel 305 as part of a channel access procedure, and determine that the channel 305 is free to use (e.g., successfully complete the channel access procedure) at some point throughout time duration 310-*b*.

As noted previously herein, it may be beneficial to perform an uplink transmission as soon as possible after passing the channel access procedure in order to win use of the channel 305 and prevent other wireless devices from winning use of the carrier over the UE 115. Accordingly, in some cases, the UE 115 may be configured to perform uplink transmissions according to a first uplink configuration after completing the channel access procedure. In some aspects, the first uplink configuration 320-*a* may include a first set of resources for uplink transmissions over a carrier. In some aspects, the first set of resources may include a first set of uplink transmission occasions 325 for uplink transmissions. The first set of uplink transmission occasions 325 may be arranged according to a first periodicity (e.g., frequency). In one aspect, as illustrated in FIG. 3, a slot 315-*a* which is configured according to the first uplink configuration 320-*a* may include a first uplink transmission occasion 325-*a* and a second uplink transmission occasion 325-*b*.

In some cases, the UE 115 may transmit an uplink transmission using the first uplink transmission occasion 325 of the first uplink configuration which follows successful completion of the channel access procedure. In cases where the first uplink configuration 320-*a* includes uplink transmission occasions 325 spaced at a frequent periodicity (e.g., two or more uplink transmission occasions 325 per time duration 310), the first uplink configuration 320-*a* may enable the UE 115 to transmit an uplink transmission quickly following the successful completion of the channel access procedure. In this regard, the first uplink configuration 320-*a* may reduce the likelihood that another wireless device will win use of the channel over the UE 115.

In some aspects, the UE 115 may transmit uplink transmissions via a carrier of the channel 305 according to the first uplink configuration 320-*a* during time durations 310-*a* and 310-*b*. In some aspects, the UE 115 may transmit uplink transmissions at any one of the uplink transmission occasions 325. The uplink transmissions may include a scheduling request transmitted via PUCCH, data transmitted via PUSCH, or both.

In some aspects, the UE 115 and/or the base station 105 may identify initiation of a COT for the channel 305 at Time A. As noted previously herein, the UE 115 may dynamically switch from the first uplink configuration 320-*a* to the second uplink configuration 320-*b* implicitly upon identifying initiation of the COT at Time A, based on explicit signaling from the base station 105, or both. For the sake of simplicity, and as illustrated in FIG. 3, it may be assumed that the UE 115 dynamically switches from the first uplink configuration 320-*a* to the second uplink configuration 320-*b* upon identifying the initiation of the COT at Time A.

In some aspects, the UE 115 may perform uplink transmissions according to the second uplink configuration while operating within a COT, for a predetermined time period, based on signaling from the base station 105, or any combination thereof. In one aspect, as shown in FIG. 3, the UE 115 may operate within the COT for time duration 310-*c*, and may thereby perform uplink transmission according to the second uplink configuration 320-*b* throughout time duration 310-*c*.

In some aspects, the second uplink configuration 320-*b* may include a second set of resources for uplink transmissions over a carrier. Once the UE 115 has won use of the channel 305 and is operating within a COT (e.g., throughout time duration 310-*c*), less frequent uplink transmission occasions 325 may be sufficient. Accordingly, in some aspects, the second set of resources may include a second set of uplink transmission occasions 325 for uplink transmissions. The second set of uplink transmission occasions 325 may be arranged according to a second periodicity (e.g., second frequency) which is less than the first periodicity. In one aspect, as illustrated in FIG. 3, slots 315 within time duration 310-*c* may include one or fewer uplink transmission occasions 325 per slot 315. In this regard, the second uplink configuration 320-*b* may exhibit less frequent (e.g., less periodic) uplink transmission occasions 325 as compared to the first uplink configuration 320-*a*.

In some aspects, UE 115, the base station 105, or both, may identify an indication to perform (e.g., transmit, receive) subsequent uplink transmissions according to (e.g., using) the first uplink configuration 320-*b*. As noted previously herein, the UE 115, the base station 105, or both, may identify the indication to perform uplink transmissions according to the first uplink configuration 320-*a* based on a termination of the COT, an expiration of a timer, MAC-CE messaging, UCI, DCI, or any combination thereof. In one aspect, as shown in FIG. 3, the UE 115 may identify a termination of the COT at Time B, and may identify an indication to perform uplink transmissions according to the first uplink configuration based on identifying the termination of the COT. In this regard, the UE 115 may perform uplink transmissions according to the first uplink configuration throughout time duration 310-*d*.

The techniques described herein may enable more efficient and reliable usage of unlicensed spectrum. In particular, the first uplink configuration 320-*a* with more frequent uplink transmission occasions 325 described herein may allow the UE 115 to transmit an uplink transmission quickly after claiming use of a channel 305, and reduce the likelihood that another wireless device will win use of the channel 305 over the UE 115. Moreover, by providing a second uplink configuration 320-*b* with less frequent uplink transmission occasions 325, available resources within the channel 305 and/or unlicensed spectrum may be increased, thereby reducing potential for interference and increasing a quantity of wireless devices which may be supported by the unlicensed spectrum.

Figure 4:
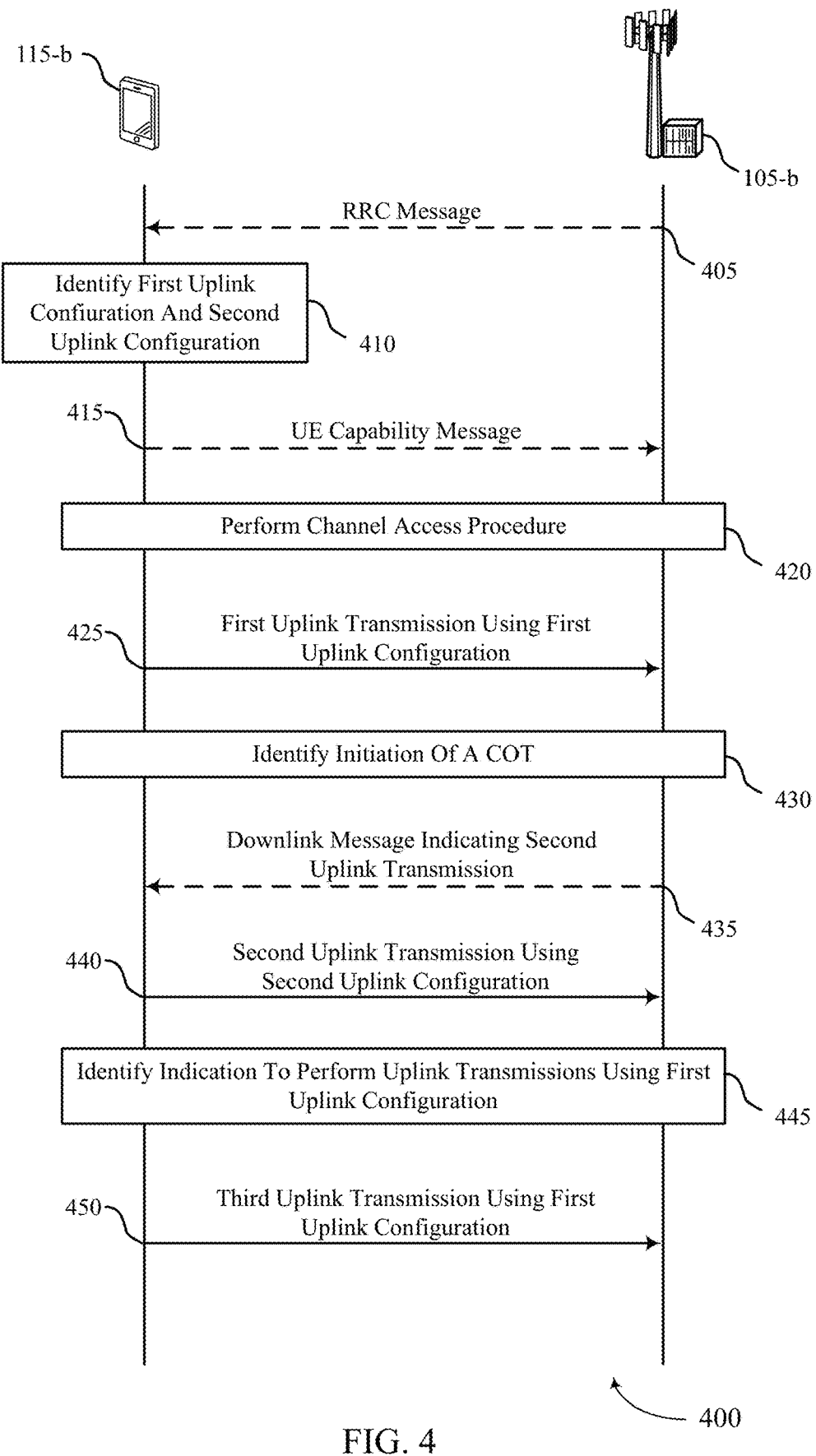
FIG. 4 illustrates an example of a process flow that supports techniques for dynamic switching of uplink configurations in accordance with aspects of the present disclosure.

FIG. 4 illustrates an example of a process flow 400 that supports techniques for dynamic switching of uplink configurations in accordance with aspects of the present disclosure. In some examples, process flow 400 may implement, or be implemented by, aspects of wireless communications systems 100 or 200, and timing diagram 300. The process flow 400 may illustrate identifying a first uplink configuration and a second uplink configuration, transmitting a first uplink transmission according to the first uplink configuration, identifying an initiation of a COT, and transmitting a second uplink transmission according to the second uplink configuration, as described with reference to FIGS. 1-3, among other aspects.

In some aspects, process flow 400 may include a UE 115-*b* and a base station 105-*b* which may be examples of corresponding devices as described herein. The UE 115-*b* illustrated in FIG. 4 may be an example of the UE 115-*a* illustrated in FIG. 2. Similarly, the base station 105-*b* illustrated in FIG. 4 may be an example of the base station 105-*a* illustrated in FIG. 2.

In some aspects, the operations illustrated in process flow 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 405, the UE 115-*b* may transmit a UE capability message to the base station 105-*b*. The UE capability message may include an indication that the UE 115-*b* is configured to perform uplink transmissions according to the first uplink configuration, the second uplink configuration, or both. In this regard, the UE capability message may include an indication that the UE 115-*b* supports dynamically switching between the first uplink configuration and the second uplink configuration.

At 410, the base station 105-*b* may transmit an RRC message including an indication of one or more uplink configurations associated with the UE 115-*b*. In some cases, the base station 105-*b* may transmit an RRC message including an indication of a first uplink configuration and a second uplink configuration associated with the UE 115-*b*. In one aspect, the RRC message may include an indication of the first uplink configuration and the second uplink configuration in cases where the UE 115-*b* indicates to the base station 105-*a* (e.g., via the UE capability message) that it is configured for dynamically switching between the first uplink configuration and the second uplink configuration. In this regard, the base station 105-*b* may determine the first uplink configuration and the second uplink configuration for a carrier associated with an unlicensed spectrum band based on the UE capability message, and transmit the RRC message based on identifying the respective uplink configurations.

In some aspects, the first uplink configuration may include a first set of resources for uplink transmissions over a carrier. Similarly, the second uplink configuration may include a second set of resources for uplink transmissions over the carrier, where the second set of uplink resources are different from the first set of uplink resources. In some aspects, the first and second sets of uplink resources may each include a set of time resources and a set of frequency resources. In some aspects, the first set of resources may include a first set of uplink transmission occasions for uplink transmissions, and the second set of resources may include a second set of uplink transmission occasions for uplink transmissions. In some cases, the first set of uplink transmission occasions are arranged according to a first periodicity, and the second set of uplink transmission occasions are arranged according to a second periodicity which is less than the first frequency. For instance, the first set of uplink transmission occasions may include two or more uplink transmission occasions per slot, and the second set of uplink transmission occasions may include one or fewer uplink transmission occasions per slot.

At 415, the UE 115-*b* may identify the first uplink configuration and the second uplink configuration. In this regard, the UE 115-*b* may identify the first set of resources associated with the first uplink configuration, and the second set of resources associated with the second uplink configuration. In some cases, the UE 115-*b* may identify the first uplink configuration and the second uplink configuration based on the RRC message received from the base station 105-*b*. Additionally or alternatively, the UE 115-*b* may identify the first uplink configuration and the second uplink configuration without any indication from the base station 105-*b*. For instance, in some cases, the UE 115-*b* may be preconfigured with the first uplink configuration and the second uplink configuration.

At 420, the UE 115-*b*, the base station 105-*b*, or both, may perform a channel access procedure. During the channel access procedure, the UE 115-*b* and/or the base station 105-*b* may monitor and evaluate a channel associated with an unlicensed spectrum band to determine if the channel is free to access. In this regard, the UE 115-*b* and/or the base station 105-*b* may perform the channel access procedure associated with a channel of the unlicensed spectrum band in an attempt to claim use of the channel. Based on performing the channel access procedure, the UE 115-*b*, the base station 105-*b*, or both, determine that the channel is free to access after determining that the channel is idle for a preconfigured duration of time (e.g., a preconfigured quantity of sensing slots).

At 425, the UE 115-*b* may transmit a first uplink transmission via a carrier according to (e.g., using) the first uplink configuration. In this regard, the UE 115-*b* may transmit the first uplink transmission using the first set of resources associated with the first uplink configuration. The UE 115-*b* may transmit the first uplink transmission at 425 based on, transmitting the UE capability message at 405, receiving the RRC message at 410, identifying the first and second uplink configurations at 415 or any combination thereof. In some cases, the first uplink transmission may include a scheduling request. The scheduling request may be transmitted via a PUCCH. Additionally or alternatively, the first uplink transmission may include data transmitted via PUSCH according to a grant (e.g., configured grant, dynamic grant).

In some aspects, the UE 115-*b* may transmit the first uplink transmission at 325 while the UE 115-*b* is not operating within a COT. Additionally or alternatively, the UE 115-*b* may transmit the first uplink transmission after passing the channel access procedure performed at 420. As noted previously herein, it may be beneficial to perform an uplink transmission as soon as possible after passing the channel access procedure in order to win use of the channel and prevent other wireless devices from winning use of the channel over the UE 115-*b*. Accordingly, in some cases, the UE 115-*b* may transmit the first uplink transmission using the first uplink transmission occasion associated the first uplink configuration which follows successful completion of the channel access procedure.

At 330, the UE 115-*b*, the base station 105-*b*, or both, may identify initiation of a COT for the carrier. In cases where the UE 115-*b* performs the channel access procedure at 420, the UE 115-*b* may additionally initiate the COT for the carrier based on performing the channel access procedure. In such cases, the UE 115-*b* and may identify the initiation of the COT based on performing the channel access procedure, initiating the COT, or both. Similarly, in cases where the base station 105-*b* performs the channel access procedure at 420, the base station 105-*b* may additionally initiate the COT for the carrier based on performing the channel access procedure. In such cases, the base station 105-*b* may identify the initiation of the COT based on performing the channel access procedure, initiating the COT, or both. In this regard, the COT may be associated with the carrier of the unlicensed spectrum band.

In cases where the base station 105-*b* performed the channel access procedure at 420, initiated the COT at 430, or both, the base station may transmit a downlink message to the UE 115-*b*, where the downlink message indicates that the base station 105-*b* performed the channel access procedure, initiated the COT, or both. For instance, the base station 105-*b* may perform the channel access procedure at 420 and/or initiate the COT at 430. In such cases, the base station 105-*b* may transmit a downlink message indicating that the base station 105-*b* initiated the COT, and the UE 115-*b* may identify the initiation of the COT based on the downlink message received from the base station 105-*b*. Conversely, in additional or alternative cases, the UE 115-*b* may perform the channel access procedure at 420 and/or initiate the COT at 430. In such cases, the UE 115-*b* may transmit an uplink message indicating that the UE 115-*b* initiated the COT, and the base station 105-*b* may identify the initiation of the COT based on the uplink message received from the UE 115-*b*.

At 435, the base station 105-*b* may transmit a downlink message to the UE 115-*b*. In some aspects, the downlink message may include an indication for the UE 115-*b* to perform uplink transmissions according to the second uplink configuration. In some aspects, the base station 105-*b* may transmit the downlink message at 435 based on identifying the initiation of the COT at 430.

At 440, the UE 115-*b* may transmit a second uplink transmission via the carrier according to (e.g., using) the second uplink configuration. In this regard, the UE 115-*b* may transmit the second uplink transmission using the second set of resources associated with the second uplink configuration. In some cases, the second uplink transmission may include a scheduling request transmitted via a PUCCH. Additionally or alternatively, the second uplink transmission may include data transmitted via PUSCH according to a grant (e.g., configured grant, dynamic grant).

The UE 115-*b* may transmit the second uplink transmission at 440 based on transmitting the UE capability message at 415, receiving the RRC message at 410, identifying the first and second uplink configurations at 415, identifying the initiation of the COT at 430, receiving the downlink message at 435, or any combination thereof. In one aspect, in some cases, the UE 115-*b* may implicitly (e.g., automatically) transmit subsequent uplink transmissions according to the second uplink configuration upon identifying that the UE 115-*b* is operating within a COT (e.g., upon identifying the initiation of the COT at 435). In such cases, the UE 115-*b* may transmit the second uplink transmission based on identifying the initiation of the COT at 430. Additionally or alternatively, the UE 115-*b* may switch from the first uplink configuration to the second uplink configuration based on explicit signaling from the base station 105-*b*. In such cases, the UE 115-*b* may switch to the second uplink configuration and transmit the second uplink transmission according to the second uplink configuration based on the downlink message received at 435.

At 445, the UE 115-*b*, the base station 105-*b*, or both, may identify an indication to perform (e.g., transmit, receive) uplink transmissions according to (e.g., using) the first uplink configuration. In some cases, the UE 115-*b* and/or the base station 105-*b* may identify the indication to perform uplink transmissions using the first uplink configuration at 445 after performing the second uplink transmission at 440. The UE 115-*b*, the base station 105-*b*, or both, may identify the indication to perform uplink transmissions according to the first uplink configuration based on a termination of the COT, an expiration of a timer, MAC-CE messaging, UCI, DCI, or any combination thereof.

In some aspects, the UE 115-*b* and/or the base station 105-*b* may identify a termination of the COT. In some cases, the UE 115-*b* and/or the base station 105-*b* may identify the termination of the COT based on a predetermined duration of the COT, or a predefined termination indicator of the COT. In such cases, the UE 115-*b* and/or the base station 105-*b* may identify the indication to perform uplink transmissions using the first uplink configuration based on identifying the termination of the COT. In this regard, the UE 115-*a* and/or the base station 105-*b* may implicitly (e.g., automatically) perform uplink transmissions according to the first uplink configuration when the respective devices are operating outside of a COT.

In additional or alternative aspects, the UE 115-*b* and/or the base station 105-*b* may identify the indication at 445 based on an expiration of a timer. In some cases, the timer may be initiated upon initiation of the COT, a downlink message transmitted by the base station 105-*b*, an uplink message transmitted by the UE 115-*b*, or any combination thereof. In such cases, the UE 115-*b* and/or the base station 105-*b* may identify the initiation of the timer, and may identify the expiration of the timer based on the initiation of the timer and a timer expiry time. The timer expiry time may be preconfigured, signaled to the UE 115-*b* and/or base station 105-*b*, or both.

In additional or alternative aspects, the UE 115-*b* and/or the base station 105-*b* may identify the indication at 445 based on DCI received from the base station 105-*b*, UCI received from the UE 115-*b*, or both. In one aspect, the UE 115-*b* may transmit UCI to the base station 105-*b*, where the UCI indicates that the UE 115-*b* will perform subsequent uplink transmissions according to the first uplink configuration. In this example, the base station 105-*b* may determine the indication at 445 based on the received UCI. In other aspects, the base station 105-*b* may transmit DCI to the UE 115-*b*, where the DCI indicates for the UE 115-*b* to perform subsequent uplink transmissions according to the first uplink configuration. In this example, the UE 115-*b* may determine the indication at 445 based on the received DCI.

In additional or alternative aspects, the UE 115-*b* and/or the base station 105-*b* may identify the indication at 445 based on MAC-CE messaging. In one aspect, the UE 115-*b* may transmit a MAC-CE message to the base station 105-*b*, where the MAC-CE message indicates that the UE 115-*b* will perform subsequent uplink transmissions according to the first uplink configuration. In this example, the base station 105-*b* may determine the indication at 445 based on the received MAC-CE message. In other aspects, the base station 105-*b* may transmit a MAC-CE message to the UE 115-*b*, where the MAC-CE message indicates for the UE 115-*b* to perform subsequent uplink transmissions according to the first uplink configuration. In this example, the UE 115-*b* may determine the indication at 445 based on the received MAC-CE message.

At 450, the UE 115-*b* may transmit a third uplink transmission via the carrier according to (e.g., using) the first uplink configuration. In this regard, the UE 115-*b* may transmit the third uplink transmission using the first set of resources associated with the first uplink configuration. In some cases, the third uplink transmission may include a scheduling request transmitted via a PUCCH. Additionally or alternatively, the third uplink transmission may include data transmitted via PUSCH according to a grant (e.g., configured grant, dynamic grant).

The UE 115-*b* may transmit the third uplink transmission at 450 based on the RRC message received at 405, identifying the first and second uplink configurations at 410, transmitting the UE capability message at 415, identifying the indication to perform uplink transmissions using the first uplink configuration at 445, or any combination thereof. In this regard, the UE 115-*b* may transmit the third uplink transmission based on a termination of the COT, an expiration of a timer, MAC-CE messaging, UCI, DCI, or any combination thereof.

The techniques described herein may enable more efficient and reliable usage of unlicensed spectrum. In particular, the first uplink configuration with more frequent uplink occasions described herein may allow the UE 115-*b* to transmit an uplink transmission quickly after claiming use of a channel, and reduce the likelihood that another wireless device will win use of the channel over the UE 115-*b*. Moreover, by providing a second uplink transmission with less frequent uplink occasions, available resources within the channel and/or unlicensed spectrum may be increased, thereby reducing potential for interference and increasing a quantity of wireless devices which may be supported by the unlicensed spectrum.

Figure 5:
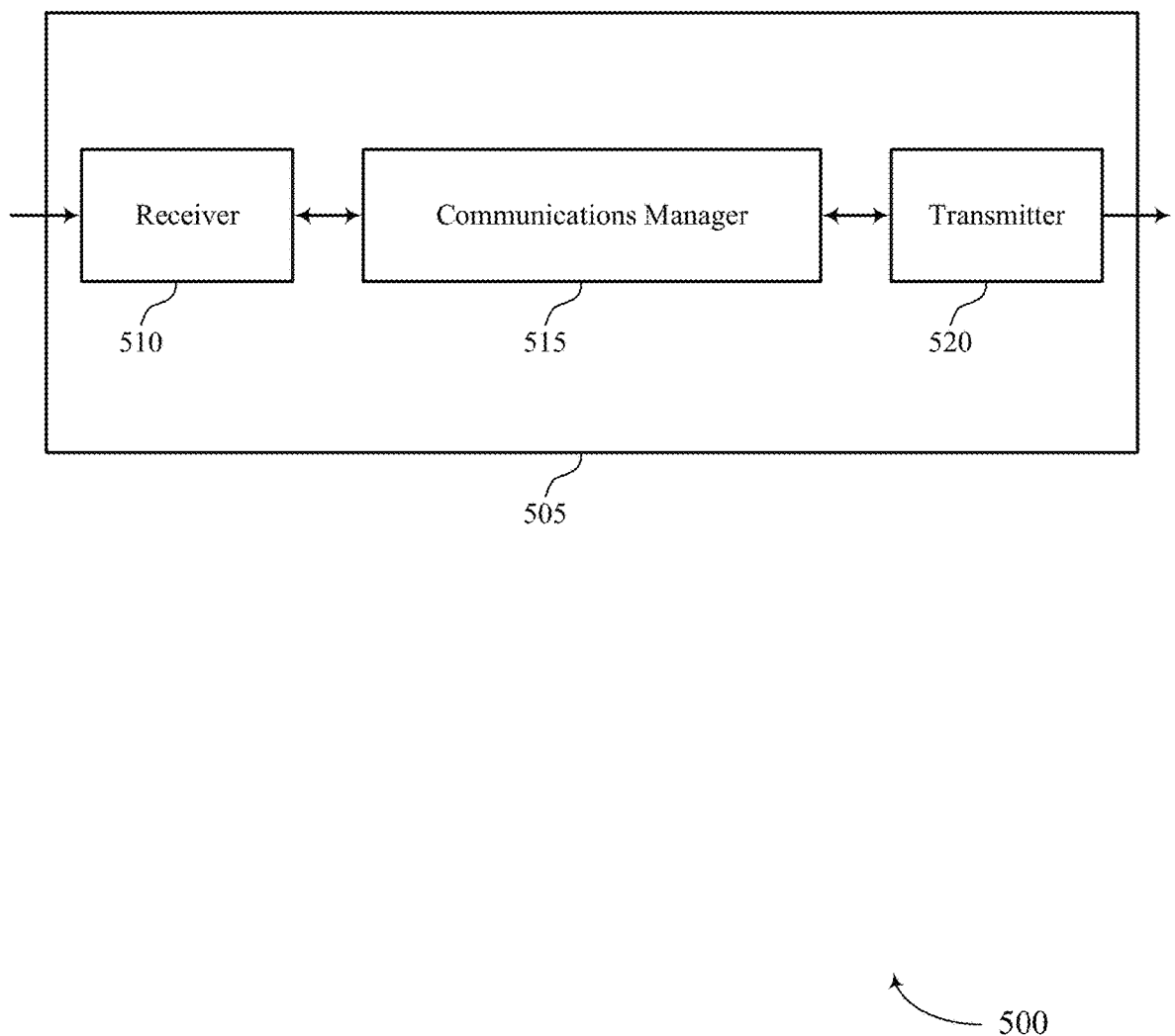
FIGS. 5 and 6 show block diagrams of devices that support techniques for dynamic switching of uplink configurations in accordance with aspects of the present disclosure.

FIG. 5 shows a block diagram 500 of a device 505 that supports techniques for dynamic switching of uplink configurations in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to techniques for dynamic switching of uplink configurations, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may identify a first uplink configuration including a first set of resources for uplink transmissions over a carrier and a second uplink configuration including a second set of resources for uplink transmissions over the carrier, where the second set of resources are different from the first set of resources, transmit, to a base station, a first uplink transmission via the carrier according to the first uplink configuration, transmit, to the base station, a second uplink transmission via the carrier according to the second uplink configuration, and identify an initiation of a COT for the carrier. The communications manager 515 may be an example of aspects of the communications manager 615 described herein.

The actions performed by the communications manager 515 as described herein may be implemented to realize one or more potential advantages. In one aspect, supporting a dynamic switch between two or more uplink configurations may enable more efficient and reliable wireless communications in the context of unlicensed spectrum. In particular, the first uplink configuration may enable a UE 115 to more efficiently and reliably win access of an unlicensed carrier while operating outside of a COT, and the second uplink configuration may reduce interference within the unlicensed spectrum and increase a quantity of wireless devices which may be supported by the unlicensed spectrum. Moreover, the increased efficiency and reliability of wireless communications may lead to an improved customer experience.

Based on dynamically switching between uplink configurations, a processor of the UE 115 (e.g., a processor controlling the receiver 510, the communications manager 515, the transmitter 520, etc.) may reduce processing resources used for wireless communications. In one aspect, by dynamically switching between uplink configurations, techniques described herein may reduce a quantity or frequency of unsuccessful attempts by the UE 115 to gain access to an unlicensed carrier. Avoiding such unsuccessful attempts may reduce the number of retransmissions used to successfully gain access to the carrier, correspondingly reducing a number of times the processor ramps up processing power and turns on processing units to handle uplink transmission and downlink reception.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. In one aspect, the transmitter 520 may be an example of aspects of the transceiver 820 described with reference to FIG. 8. The transmitter 520 may utilize a single antenna or a set of antennas.

Figure 6:
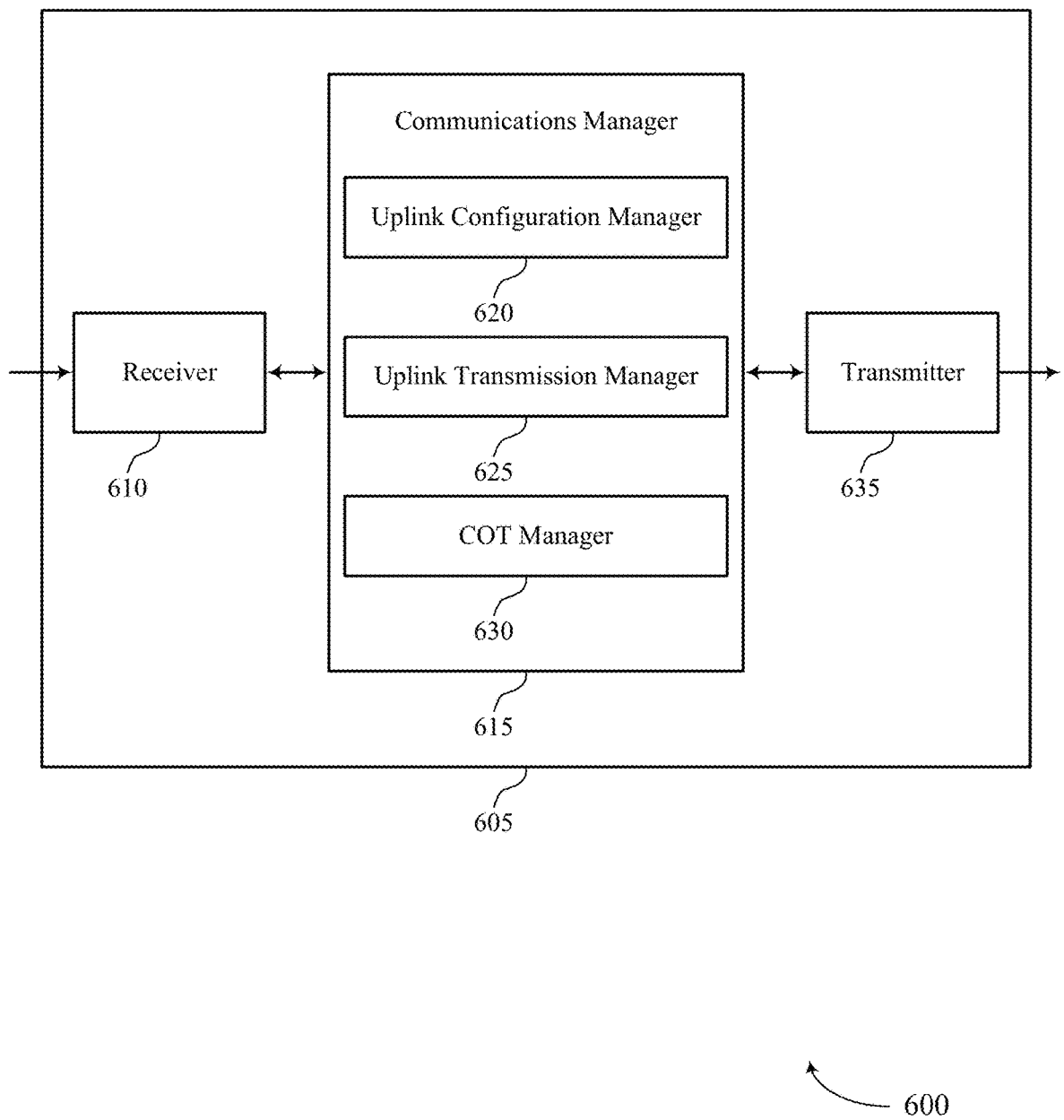

FIG. 6 shows a block diagram 600 of a device 605 that supports techniques for dynamic switching of uplink configurations in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to techniques for dynamic switching of uplink configurations, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include an uplink configuration manager 620, an uplink transmission manager 625, and a COT manager 630. The communications manager 615 may be an example of aspects of the communications manager 810 described herein.

The uplink configuration manager 620 may identify a first uplink configuration including a first set of resources for uplink transmissions over a carrier and a second uplink configuration including a second set of resources for uplink transmissions over the carrier, where the second set of resources are different from the first set of resources.

The uplink transmission manager 625 may transmit, to a base station, a first uplink transmission via the carrier according to the first uplink configuration and transmit, to the base station, a second uplink transmission via the carrier according to the second uplink configuration.

The COT manager 630 may identify an initiation of a COT for the carrier.

The transmitter 635 may transmit signals generated by other components of the device 605. In some examples, the transmitter 635 may be collocated with a receiver 610 in a transceiver module. In one aspect, the transmitter 635 may be an example of aspects of the transceiver 820 described with reference to FIG. 7. The transmitter 635 may utilize a single antenna or a set of antennas.

Figure 7:
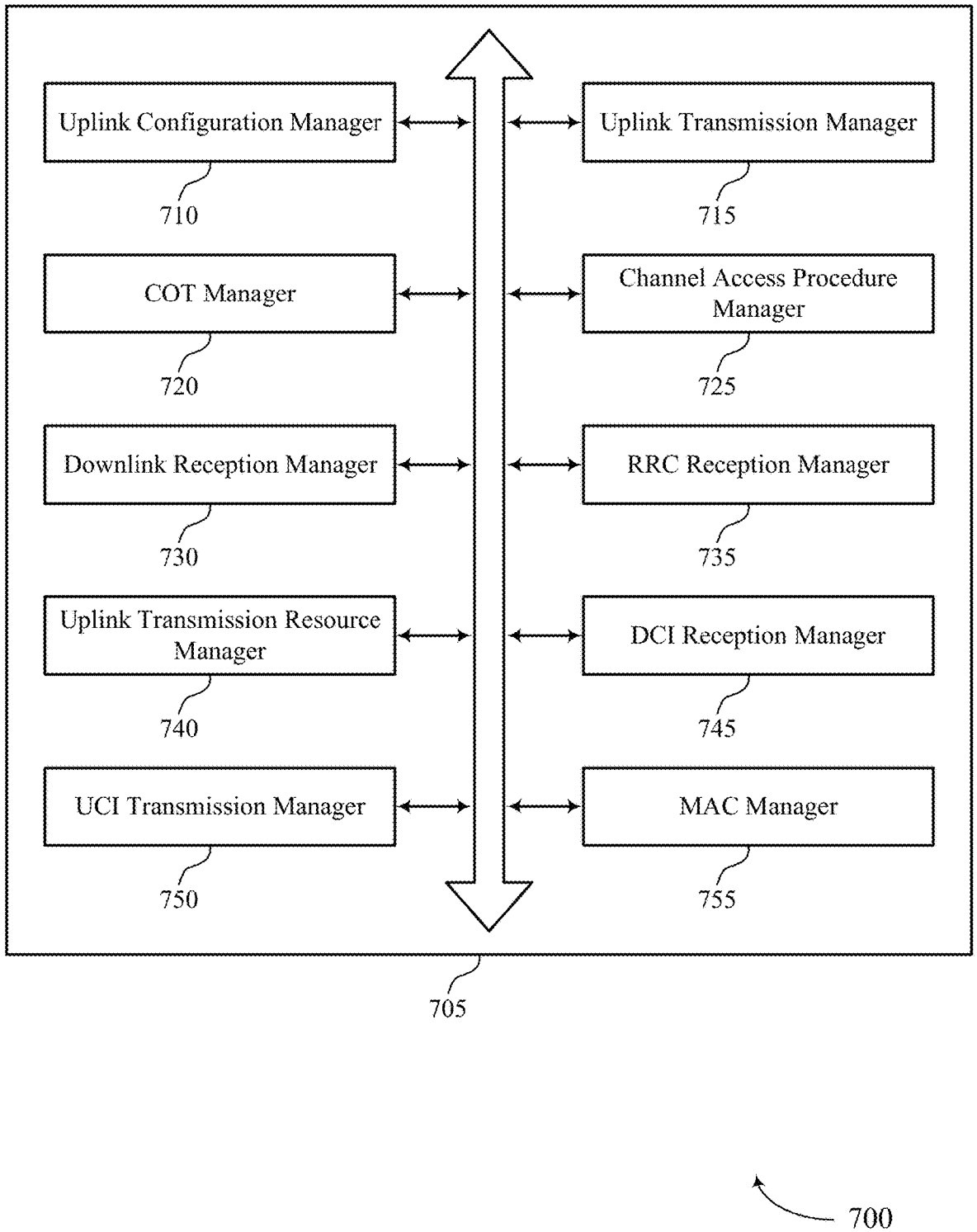
FIG. 7 shows a block diagram of a communications manager that supports techniques for dynamic switching of uplink configurations in accordance with aspects of the present disclosure.

FIG. 7 shows a block diagram 700 of a communications manager 705 that supports techniques for dynamic switching of uplink configurations in accordance with aspects of the present disclosure. The communications manager 705 may be an example of aspects of a communications manager 515, a communications manager 615, or a communications manager 810 described herein. The communications manager 705 may include an uplink configuration manager 710, an uplink transmission manager 715, a COT manager 720, a channel access procedure manager 725, a downlink reception manager 730, an RRC reception manager 735, an uplink transmission resource manager 740, a DCI reception manager 745, an UCI transmission manager 750, and a MAC manager 755. Each of these modules may communicate, directly or indirectly, with one another (e.g., via one or more buses).

The uplink configuration manager 710 may identify a first uplink configuration including a first set of resources for uplink transmissions over a carrier and a second uplink configuration including a second set of resources for uplink transmissions over the carrier, where the second set of resources are different from the first set of resources. For example, the uplink configuration manager 710 may receive a control message including the first uplink configuration and the second uplink configuration.

The uplink transmission manager 715 may transmit, to a base station, a first uplink transmission via the carrier according to the first uplink configuration. In some examples, the uplink transmission manager 715 may transmit, to the base station, a second uplink transmission via the carrier according to the second uplink configuration. In some examples, the uplink transmission manager 715 may determine an indication to perform uplink transmissions according to the first uplink configuration after transmitting the second uplink transmission.

In some examples, the uplink transmission manager 715 may transmit, to the base station, a third uplink transmission according to the first uplink configuration based on identifying the indication to perform uplink transmissions according to the first uplink configuration. In some examples, the uplink transmission manager 715 may identify an expiration of a timer associated with the second uplink configuration, where determining the indication to perform uplink transmissions according to the first uplink configuration is based on identifying the expiration of the timer.

In some examples, the uplink transmission manager 715 may identify an initiation of the timer based on identifying the initiation of the COT, a downlink message received from the base station, or both, where identifying the expiration of the timer is based on identifying the initiation of the timer and a timer expiry time. In some examples, the uplink transmission manager 715 may transmit, to the base station, a UE capability message including an indication that the UE is configured to perform uplink transmissions according to the first uplink configuration, the second uplink configuration, or both, where transmitting at least one of the first uplink transmission or the second uplink transmission is based on transmitting the UE capability message. In some examples, the uplink transmission manager 715 may transmit, to the base station, a UE capability message including an indication that the UE supports dynamically switching between the first uplink configuration and the second uplink configuration, where transmitting at least one of the first uplink transmission or the second uplink transmission is based on transmitting the UE capability message.

In some cases, the first set of resources include a first set of uplink transmission occasions for uplink transmissions, and the second set of resources include a second set of uplink transmission occasions for uplink transmissions. In some cases, the first set of uplink transmission occasions are arranged according to a first periodicity, and the second set of uplink transmission occasions are arranged according to a second periodicity which is less than the first periodicity. In some cases, the first set of uplink transmission occasions include two or more uplink transmission occasions per slot, and the second set of uplink transmission occasions include one or fewer uplink transmission occasions per slot.

In some cases, at least one of the first uplink transmission or the second uplink transmission includes a scheduling request transmitted via a physical uplink control channel. In some cases, at least one of the first uplink transmission or the second uplink transmission is transmitted according to a configured grant via a physical uplink shared channel.

The COT manager 720 may identify an initiation of a COT for the carrier. In some examples, the COT manager 720 may initiate the COT for the carrier based on performing the channel access procedure, where identifying the initiation of the COT is based on initiating the COT. In some examples, the COT manager 720 may identify a termination of the COT for the carrier, where determining the indication to perform uplink transmissions according to the first uplink configuration is based on identifying the termination of the COT. In some cases, the carrier and the COT are associated with an unlicensed spectrum band.

The channel access procedure manager 725 may perform a channel access procedure for the carrier.

The downlink reception manager 730 may receive, from the base station, a downlink message including an indication that the base station has initiated the COT, where identifying the initiation of the COT is based on receiving the downlink message.

In some examples, the downlink reception manager 730 may receive, from the base station, a downlink message including an indication for the UE to perform uplink transmissions according to the second uplink configuration, where transmitting the second uplink transmission according to the second uplink configuration is based on receiving the downlink message.

The RRC reception manager 735 may receive, from the base station, an RRC message indicating the first uplink configuration and the second uplink configuration, where identifying the first uplink configuration and the second uplink configuration is based on receiving the RRC message.

The DCI reception manager 745 may receive, from the base station, DCI indicating for the UE to perform uplink transmissions according to the first uplink configuration, where determining the indication to perform uplink transmissions according to the first uplink configuration is based on receiving the DCI.

The UCI transmission manager 750 may transmit, to the base station, UCI indicating that the UE will perform subsequent uplink transmissions according to the first uplink configuration, where the third uplink transmission is transmitted based on transmitting the UCI.

The MAC manager 755 may transmit a first MAC-CE message, receiving a second MAC-CE message, or both, where the first MAC-CE message and the second MAC-CE message include an indication for the UE to perform subsequent uplink transmissions according to the first uplink configuration, where transmitting the third uplink transmission is based on transmitting the first MAC-CE message, receiving the second MAC-CE message, or both.

Figure 8:
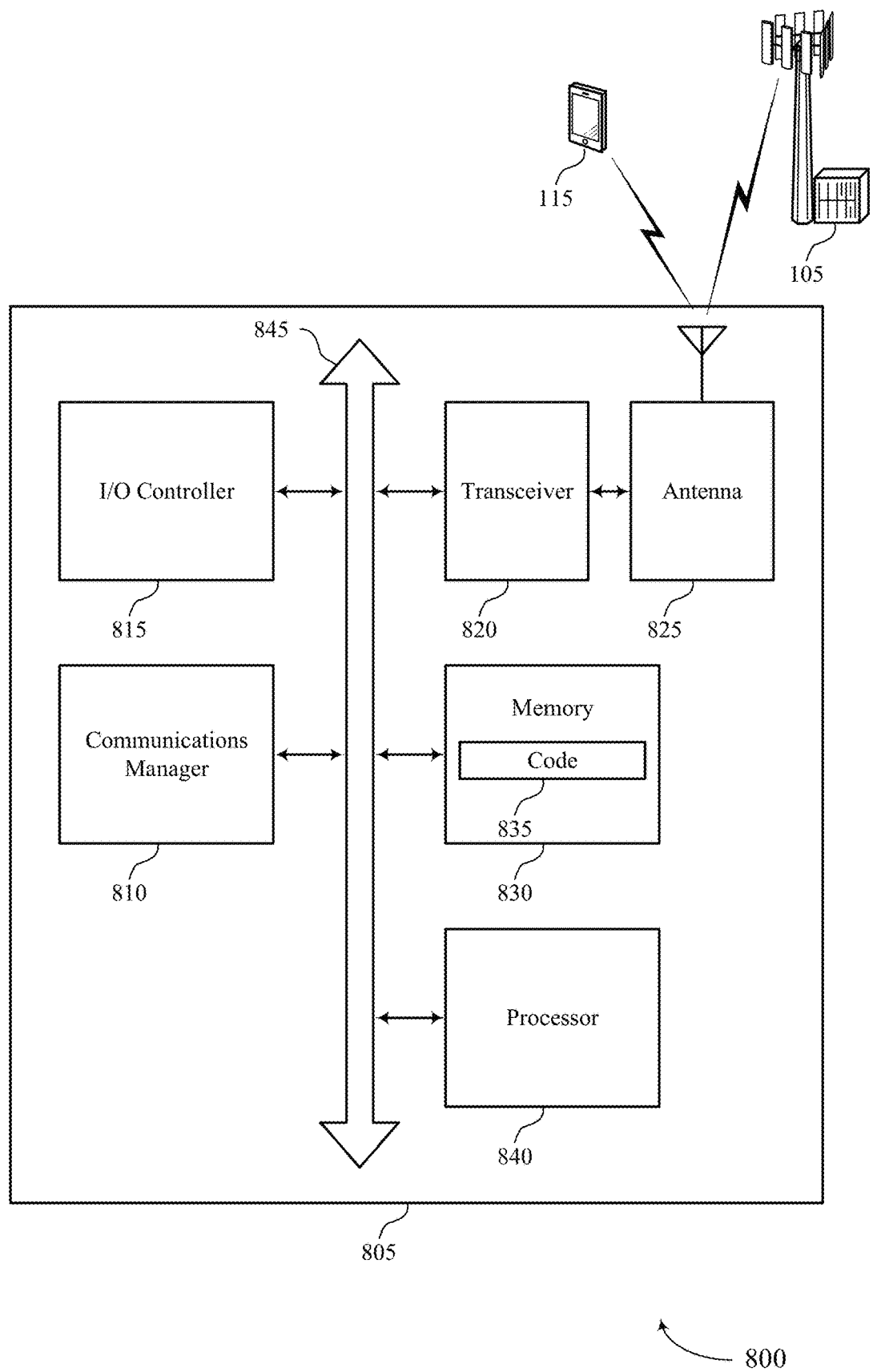
FIG. 8 shows a diagram of a system including a device that supports techniques for dynamic switching of uplink configurations in accordance with aspects of the present disclosure.

FIG. 8 shows a diagram of a system 800 including a device 805 that supports techniques for dynamic switching of uplink configurations in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify a first uplink configuration including a first set of resources for uplink transmissions over a carrier and a second uplink configuration including a second set of resources for uplink transmissions over the carrier, where the second set of resources are different from the first set of resources. For example, the communications manager 810 may receive control signaling including the first uplink configuration and the second uplink configuration. The communications manager 810 may transmit, to a base station, a first uplink transmission via the carrier according to the first uplink configuration. The communications manager 810 may identify an initiation of a COT for the carrier, and may transmit, to the base station based at least in part on identifying the initiation of the COT, a second uplink transmission via the carrier according to the second uplink configuration.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. In one aspect, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for dynamic switching of uplink configurations).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
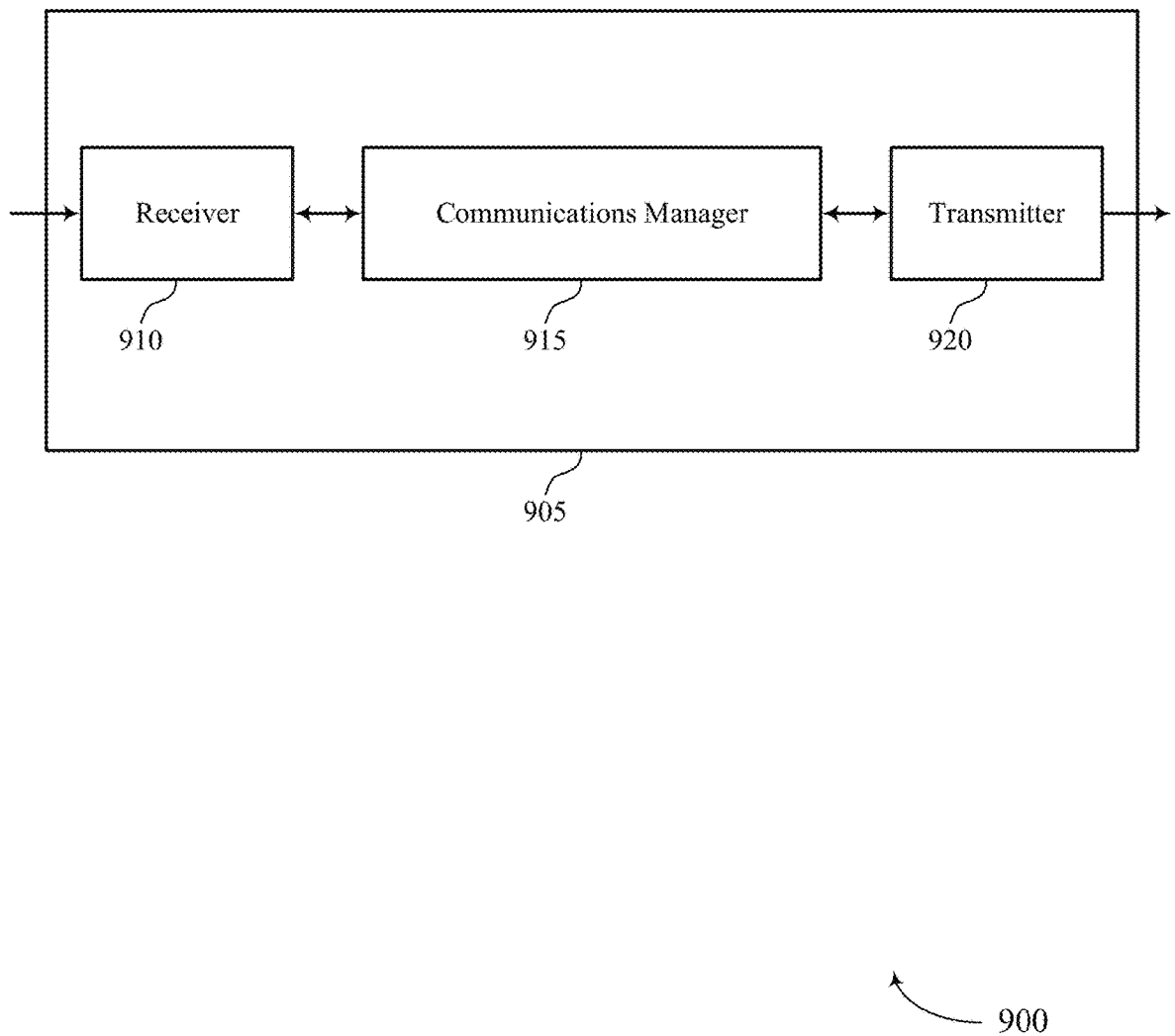
FIGS. 9 and 10 show block diagrams of devices that support techniques for dynamic switching of uplink configurations in accordance with aspects of the present disclosure.

FIG. 9 shows a block diagram 900 of a device 905 that supports techniques for dynamic switching of uplink configurations in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to techniques for dynamic switching of uplink configurations, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify a first uplink configuration including a first set of resources for uplink transmissions over a carrier and a second uplink configuration including a second set of resources for uplink transmissions over the carrier, where the second set of resources are different from the first set of resources, receive, from a UE, a first uplink transmission via the carrier according to the first uplink configuration, receive, from the UE, a second uplink transmission via the carrier according to the second uplink configuration, and identify an initiation of a COT for the carrier. The communications manager 915 may be an example of aspects of the communications manager 1015 described herein.

The actions performed by the communications manager 915 as described herein may be implemented to realize one or more potential advantages. In one aspect, supporting a dynamic switch between two or more uplink configurations may enable more efficient and reliable wireless communications in the context of unlicensed spectrum. In particular, the first uplink configuration may enable a UE 115 to more efficiently and reliably win access of an unlicensed carrier while operating outside of a COT, and the second uplink configuration may reduce interference within the unlicensed spectrum and increase a quantity of wireless devices which may be supported by the unlicensed spectrum. Moreover, the increased efficiency and reliability of wireless communications may lead to an improved customer experience.

Based on dynamically switching between uplink configurations, a processor of the base station 105 (e.g., a processor controlling the receiver 910, the communications manager 915, the transmitter 920, etc.) may reduce processing resources used for wireless communications. In one aspect, by dynamically switching between uplink configurations, techniques described herein may reduce a quantity or frequency of unsuccessful attempts by the UE 115 to gain access to an unlicensed carrier. Avoiding such unsuccessful attempts may reduce the number of retransmissions used to successfully gain access to the carrier, correspondingly reducing a number of times the processor ramps up processing power and turns on processing units to handle uplink transmission and downlink reception.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. In one aspect, the transmitter 920 may be an example of aspects of the transceiver 1220 described with reference to FIG. 12. The transmitter 920 may utilize a single antenna or a set of antennas.

Figure 10:
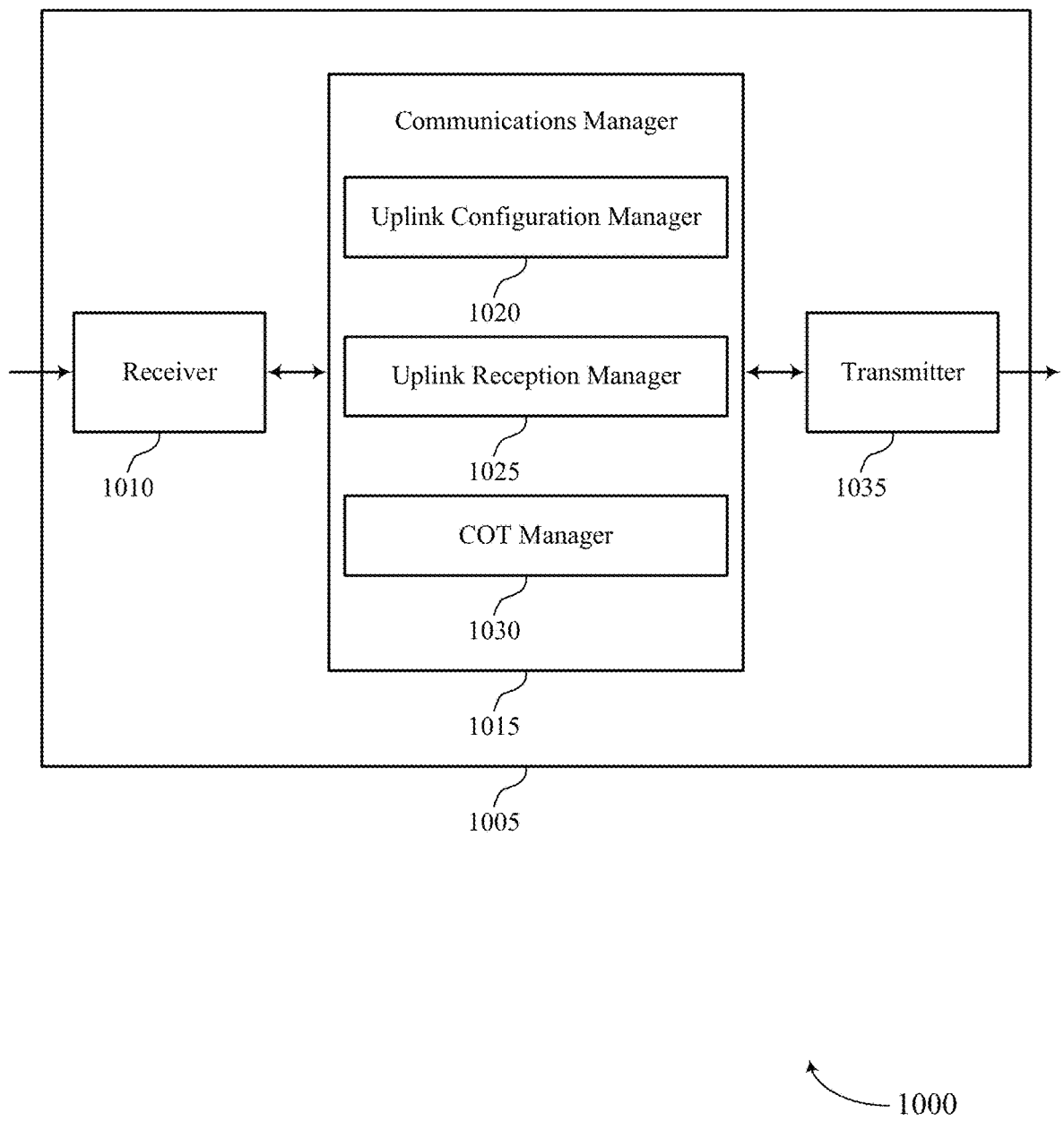

FIG. 10 shows a block diagram 1000 of a device 1005 that supports techniques for dynamic switching of uplink configurations in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to techniques for dynamic switching of uplink configurations, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include an uplink configuration manager 1020, an uplink reception manager 1025, and a COT manager 1030. The communications manager 1015 may be an example of aspects of the communications manager 1015 described herein.

The uplink configuration manager 1020 may identify a first uplink configuration including a first set of resources for uplink transmissions over a carrier and a second uplink configuration including a second set of resources for uplink transmissions over the carrier, where the second set of resources are different from the first set of resources.

The uplink reception manager 1025 may receive, from a UE, a first uplink transmission via the carrier according to the first uplink configuration and receive, from the UE, a second uplink transmission via the carrier according to the second uplink configuration.

The COT manager 1030 may identify an initiation of a COT for the carrier.

The transmitter 1035 may transmit signals generated by other components of the device 1005. In some examples, the transmitter 1035 may be collocated with a receiver 1010 in a transceiver module. In one aspect, the transmitter 1035 may be an example of aspects of the transceiver 1220 described with reference to FIG. 12. The transmitter 1035 may utilize a single antenna or a set of antennas.

Figure 11:
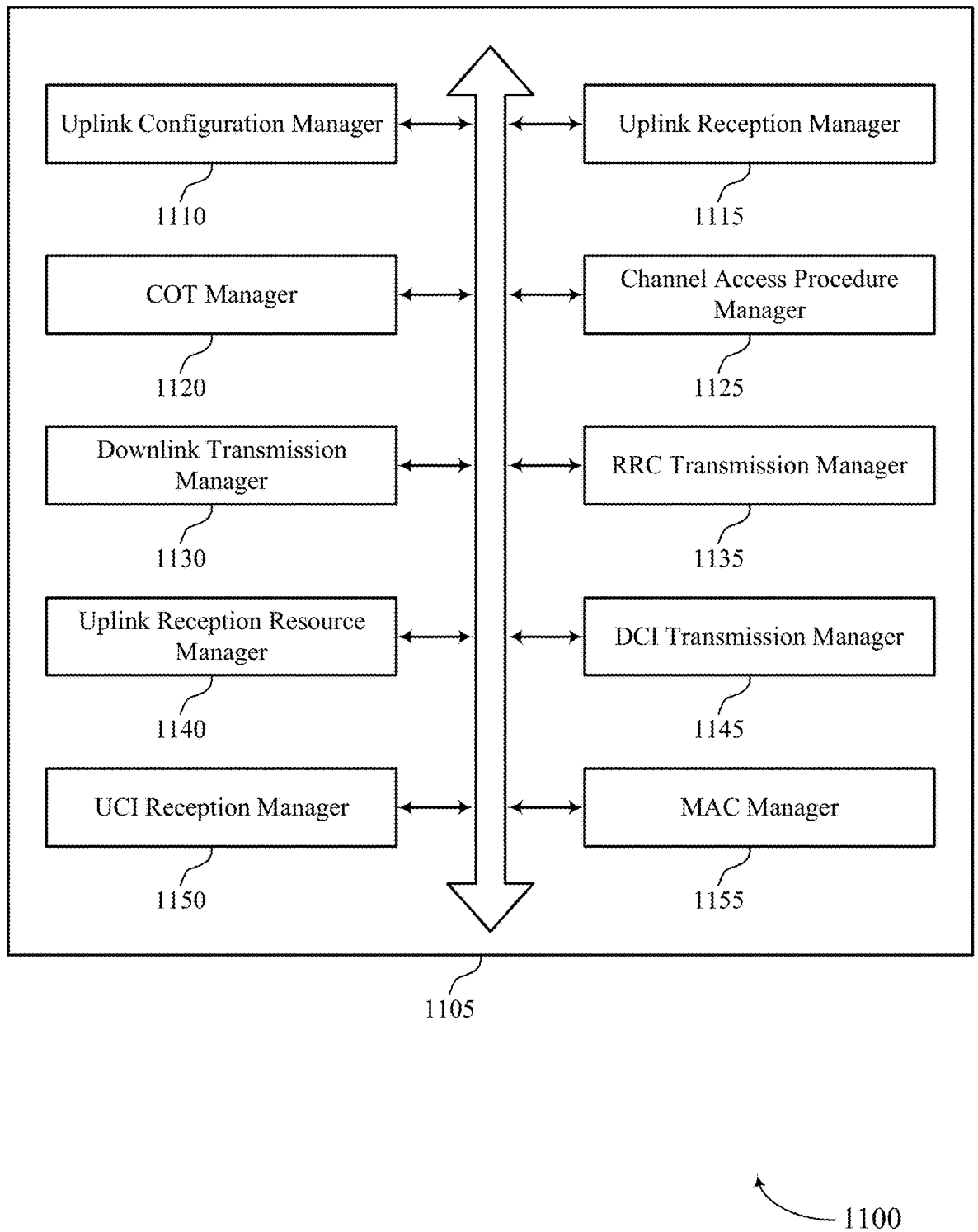
FIG. 11 shows a block diagram of a communications manager that supports techniques for dynamic switching of uplink configurations in accordance with aspects of the present disclosure.

FIG. 11 shows a block diagram 1100 of a communications manager 1105 that supports techniques for dynamic switching of uplink configurations in accordance with aspects of the present disclosure. The communications manager 1105 may be an example of aspects of a communications manager 915, a communications manager 1015, or a communications manager 1015 described herein. The communications manager 1105 may include an uplink configuration manager 1110, an uplink reception manager 1115, a COT manager 1120, a channel access procedure manager 1125, a downlink transmission manager 1130, an RRC transmission manager 1135, an uplink reception resource manager 1140, a DCI transmission manager 1145, an UCI reception manager 1150, and a MAC manager 1155. Each of these modules may communicate, directly or indirectly, with one another (e.g., via one or more buses).

The uplink configuration manager 1110 may identify a first uplink configuration including a first set of resources for uplink transmissions over a carrier and a second uplink configuration including a second set of resources for uplink transmissions over the carrier, where the second set of resources are different from the first set of resources. In some examples, the uplink configuration manager 1110 may determine an indication to receive uplink transmissions according to the first uplink configuration after transmitting the second uplink transmission. The uplink reception manager 1115 may receive, from a UE, a first uplink transmission via the carrier according to the first uplink configuration.

In some examples, the uplink reception manager 1115 may receive, from the UE, a second uplink transmission via the carrier according to the second uplink configuration. In some examples, the uplink reception manager 1115 may receive, from the UE, an indication that the UE has initiated the COT, where identifying the initiation of the COT is based on receiving the indication. In some examples, the uplink reception manager 1115 may receive, from the UE, a third uplink transmission according to the first uplink configuration based on identifying the indication to receive uplink transmissions according to the first uplink configuration.

In some examples, the uplink reception manager 1115 may identify an expiration of a timer associated with the second uplink configuration, where determining the indication to receive uplink transmissions according to the first uplink configuration is based on identifying the expiration of the timer. In some examples, the uplink reception manager 1115 may identify an initiation of the timer based on identifying the initiation of the COT, an uplink message received from the UE, or both, where identifying the expiration of the timer is based on identifying the initiation of the timer and a timer expiry time. In some examples, the uplink reception manager 1115 may receive, from the UE, a UE capability message including an indication that the UE is configured to perform uplink transmissions according to the first uplink configuration, the second uplink configuration, or both, where receiving at least one of the first uplink transmission or the second uplink transmission is based on receiving the UE capability message. In some examples, the uplink reception manager 1115 may receive, from the UE, a UE capability message including an indication that the UE supports dynamically switching between the first uplink configuration and the second uplink configuration, where receiving at least one of the first uplink transmission or the second uplink transmission is based on receiving the UE capability message.

In some cases, the first set of resources include a first set of uplink transmission occasions for uplink transmissions, and the second set of resources include a second set of uplink transmission occasions for uplink transmissions. In some cases, the first set of uplink transmission occasions are arranged according to a first periodicity, and the second set of uplink transmission occasions are arranged according to a second periodicity which is less than the first periodicity. In some cases, the first set of uplink transmission occasions include two or more uplink transmission occasions per slot, and the second set of uplink transmission occasions include one or fewer uplink transmission occasions per slot.

In some cases, at least one of the first uplink transmission or the second uplink transmission includes a scheduling request transmitted via a physical uplink control channel. In some cases, at least one of the first uplink transmission or the second uplink transmission is received according to a configured grant via a physical uplink shared channel.

The COT manager 1120 may identify an initiation of a COT for the carrier. In some examples, the COT manager 1120 may initiate the COT for the carrier based on performing the channel access procedure, where identifying the initiation of the COT is based on initiating the COT. In some examples, the COT manager 1120 may identify a termination of the COT for the carrier, where determining the indication to receive uplink transmissions according to the first uplink configuration is based on identifying the termination of the COT. In some cases, the carrier and the COT are associated with an unlicensed spectrum band.

The channel access procedure manager 1125 may perform a channel access procedure for the carrier.

The downlink transmission manager 1130 may transmit, to the UE, a downlink message including an indication for the UE to perform uplink transmissions according to the second uplink configuration, where receiving the second uplink transmission according to the second uplink configuration is based on transmitting the downlink message.

The RRC transmission manager 1135 may transmit, to the UE, an RRC message indicating the first uplink configuration and the second uplink configuration based on identifying the first uplink configuration and the second uplink configuration.

The DCI transmission manager 1145 may transmit, to the UE, DCI indicating for the UE to perform uplink transmissions according to the first uplink configuration based on determining the indication to receive uplink transmissions according to the first uplink configuration.

The UCI reception manager 1150 may receive, from the UE, UCI indicating that the UE will perform subsequent uplink transmissions according to the first uplink configuration, where the third uplink transmission is received based on receiving the UCI.

The MAC manager 1155 may receive a first MAC-CE message, transmitting a second MAC-CE message, or both, where the first MAC-CE message and the second MAC-CE message include an indication for the UE to perform subsequent uplink transmissions according to the first uplink configuration, where receiving the third uplink transmission is based on receiving the first MAC-CE message, transmitting the second MAC-CE message, or both.

Figure 12:
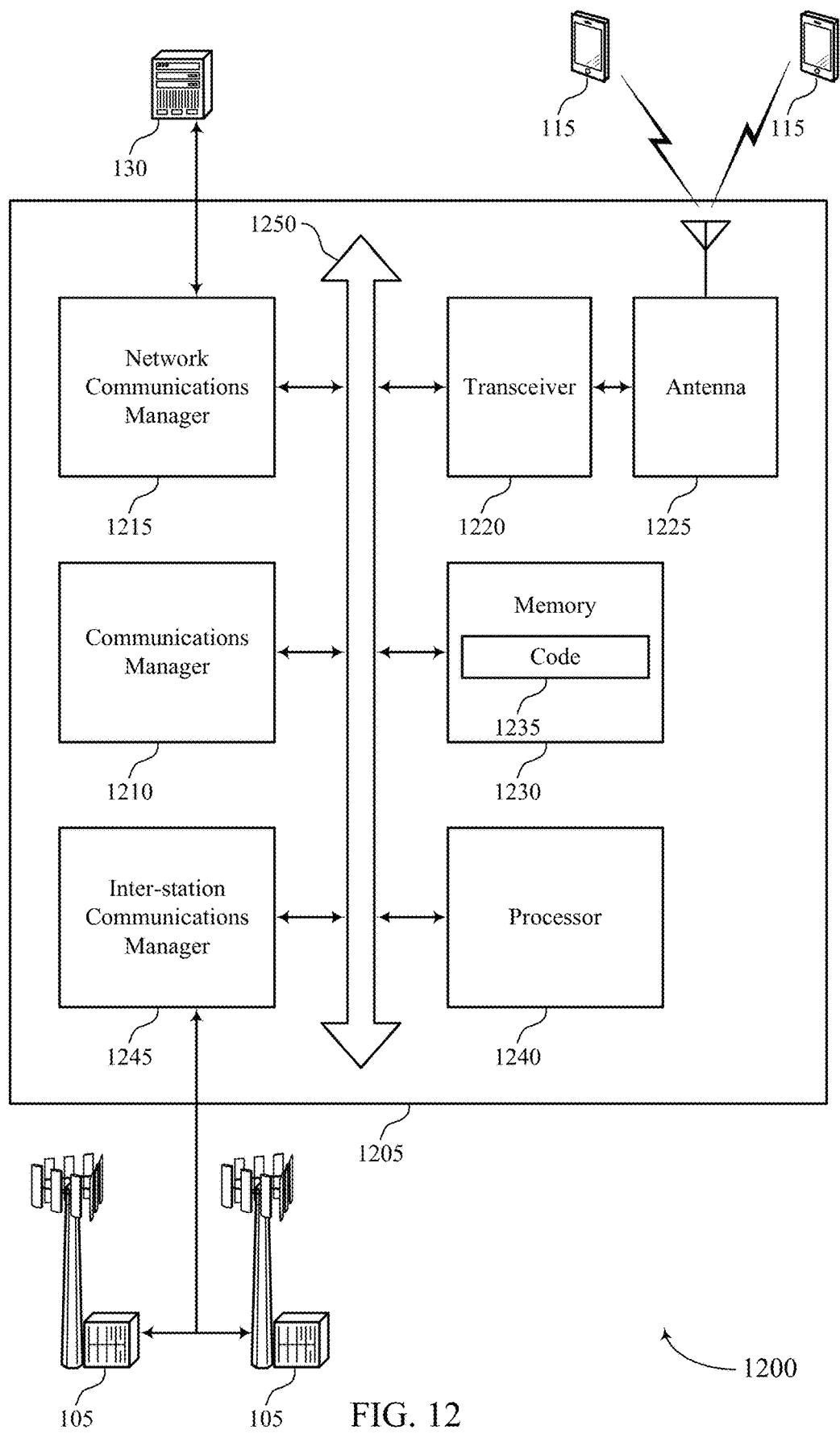
FIG. 12 shows a diagram of a system including a device that supports techniques for dynamic switching of uplink configurations in accordance with aspects of the present disclosure.

FIG. 12 shows a diagram of a system 1200 including a device 1205 that supports techniques for dynamic switching of uplink configurations in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may identify a first uplink configuration including a first set of resources for uplink transmissions over a carrier and a second uplink configuration including a second set of resources for uplink transmissions over the carrier, where the second set of resources are different from the first set of resources, receive, from a UE, a first uplink transmission via the carrier according to the first uplink configuration, receive, from the UE, a second uplink transmission via the carrier according to the second uplink configuration, and identify an initiation of a COT for the carrier.

The network communications manager 1215 may manage communications with the core network (e.g., via one or more wired backhaul links). In one aspect, the network communications manager 1215 may manage the transfer of data communications for client devices, such as one or more UEs 115.

The transceiver 1220 may communicate bi-directionally, via one or more antennas, wired, or wireless links as described above. In one aspect, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting techniques for dynamic switching of uplink configurations).

The inter-station communications manager 1245 may manage communications with other base station 105, and may include a controller or scheduler for controlling communications with UEs 115 in cooperation with other base stations 105. In one aspect, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
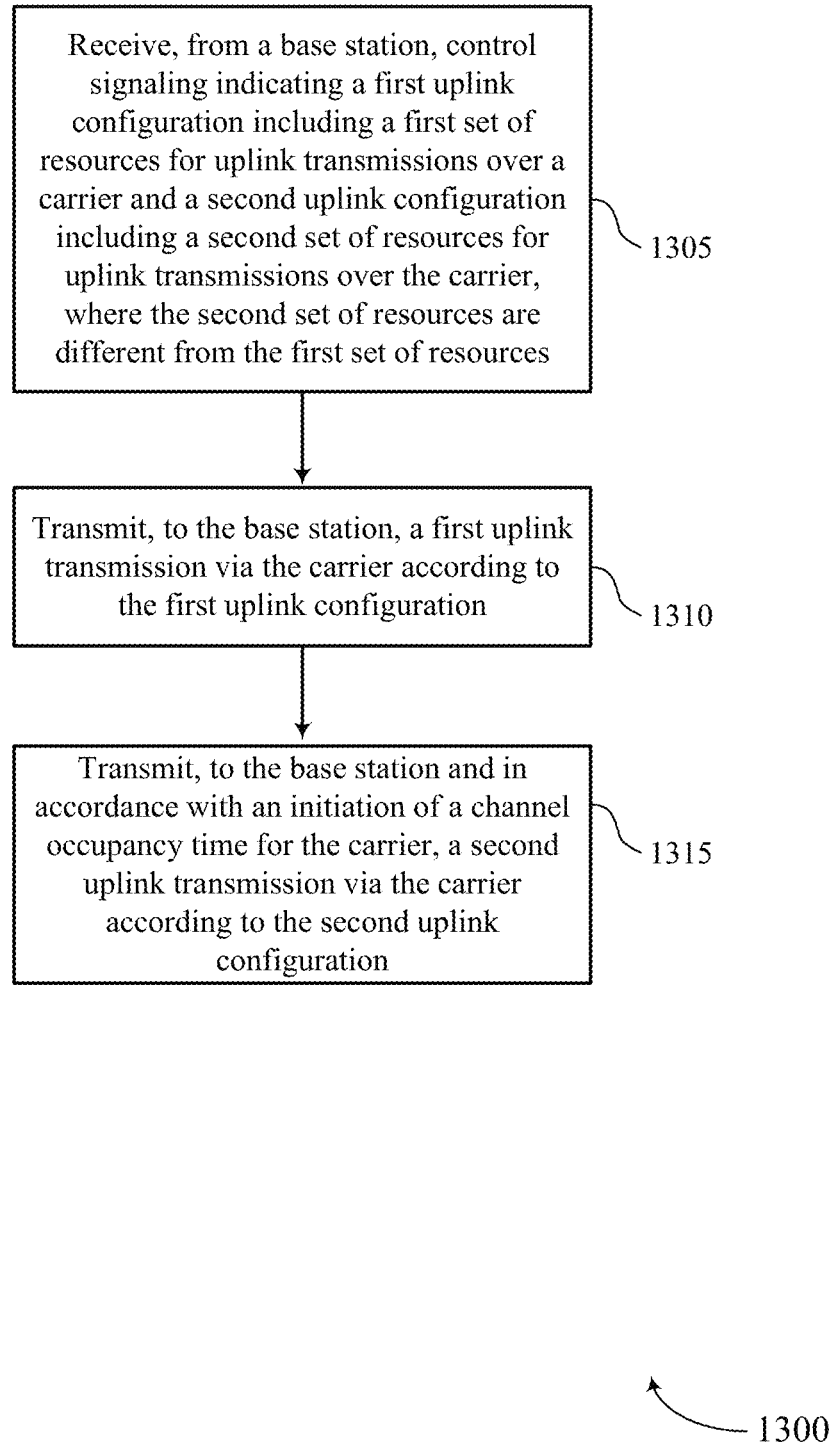
FIGS. 13 through 17 show flowcharts illustrating methods that support techniques for dynamic switching of uplink configurations in accordance with aspects of the present disclosure.

FIG. 13 shows a flowchart illustrating a method 1300 that supports techniques for dynamic switching of uplink configurations in accordance with aspects of the present disclosure. The operations of method 1300 may be implemented by a UE 115 or its components as described herein. In one aspect, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive, from a base station, control signaling indicating a first uplink configuration including a first set of resources for uplink transmissions over a carrier and a second uplink configuration including a second set of resources for uplink transmissions over the carrier, where the second set of resources are different from the first set of resources. The operations of 1305 may be performed according to the methods described herein. In some examples, aspects of the operations of 1305 may be performed by an uplink configuration manager as described with reference to FIGS. 5 through 8.

At 1310, the UE may transmit, to the base station, a first uplink transmission via the carrier according to the first uplink configuration. The operations of 1310 may be performed according to the methods described herein. In some examples, aspects of the operations of 1310 may be performed by an uplink transmission manager as described with reference to FIGS. 5 through 8.

At 1315, the UE may transmit, to the base station and based at least in part on an initiation of a COT for the carrier, a second uplink transmission via the carrier according to the second uplink configuration. The operations of 1315 may be performed according to the methods described herein. In some examples, aspects of the operations of 1315 may be performed by an uplink transmission manager as described with reference to FIGS. 5 through 8.

Figure 14:
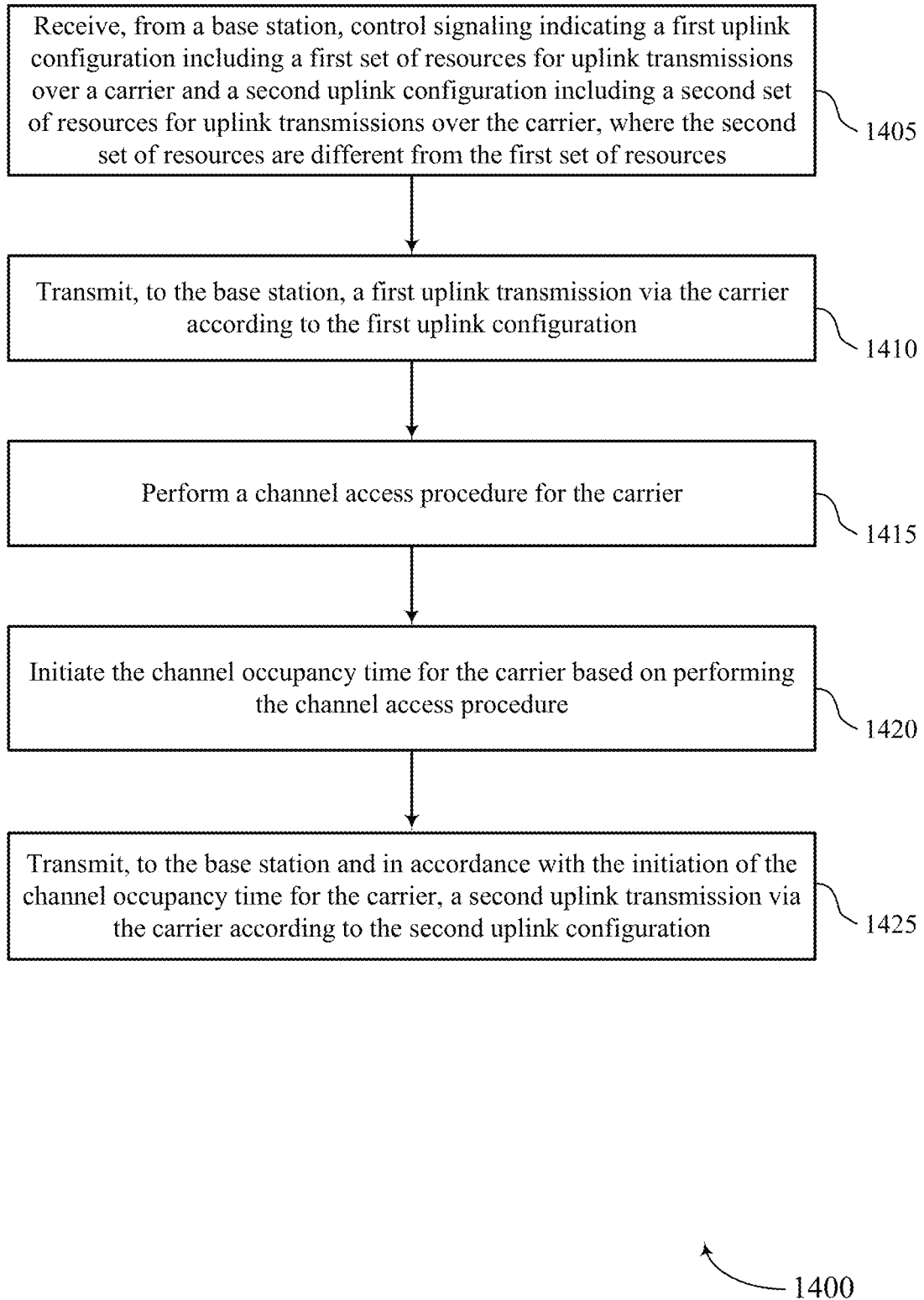

FIG. 14 shows a flowchart illustrating a method 1400 that supports techniques for dynamic switching of uplink configurations in accordance with aspects of the present disclosure. The operations of method 1400 may be implemented by a UE 115 or its components as described herein. In one aspect, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, control signaling indicating a first uplink configuration including a first set of resources for uplink transmissions over a carrier and a second uplink configuration including a second set of resources for uplink transmissions over the carrier, where the second set of resources are different from the first set of resources. The operations of 1405 may be performed according to the methods described herein. In some examples, aspects of the operations of 1405 may be performed by an uplink configuration manager as described with reference to FIGS. 5 through 8.

At 1410, the UE may transmit, to the base station, a first uplink transmission via the carrier according to the first uplink configuration. The operations of 1410 may be performed according to the methods described herein. In some examples, aspects of the operations of 1410 may be performed by an uplink transmission manager as described with reference to FIGS. 5 through 8.

At 1415, the UE may perform a channel access procedure for the carrier. The operations of 1415 may be performed according to the methods described herein. In some examples, aspects of the operations of 1415 may be performed by a channel access procedure manager as described with reference to FIGS. 5 through 8.

At 1420, the UE may initiate the COT for the carrier based on performing the channel access procedure. The operations of 1420 may be performed according to the methods described herein. In some examples, aspects of the operations of 1420 may be performed by a COT manager as described with reference to FIGS. 5 through 8.

At 1425, the UE may transmit, to the base station and based at least in part on the initiation of the COT for the carrier, a second uplink transmission via the carrier according to the second uplink configuration. The operations of 1425 may be performed according to the methods described herein. In some examples, aspects of the operations of 1425 may be performed by an uplink transmission manager as described with reference to FIGS. 5 through 8.

Figure 15:
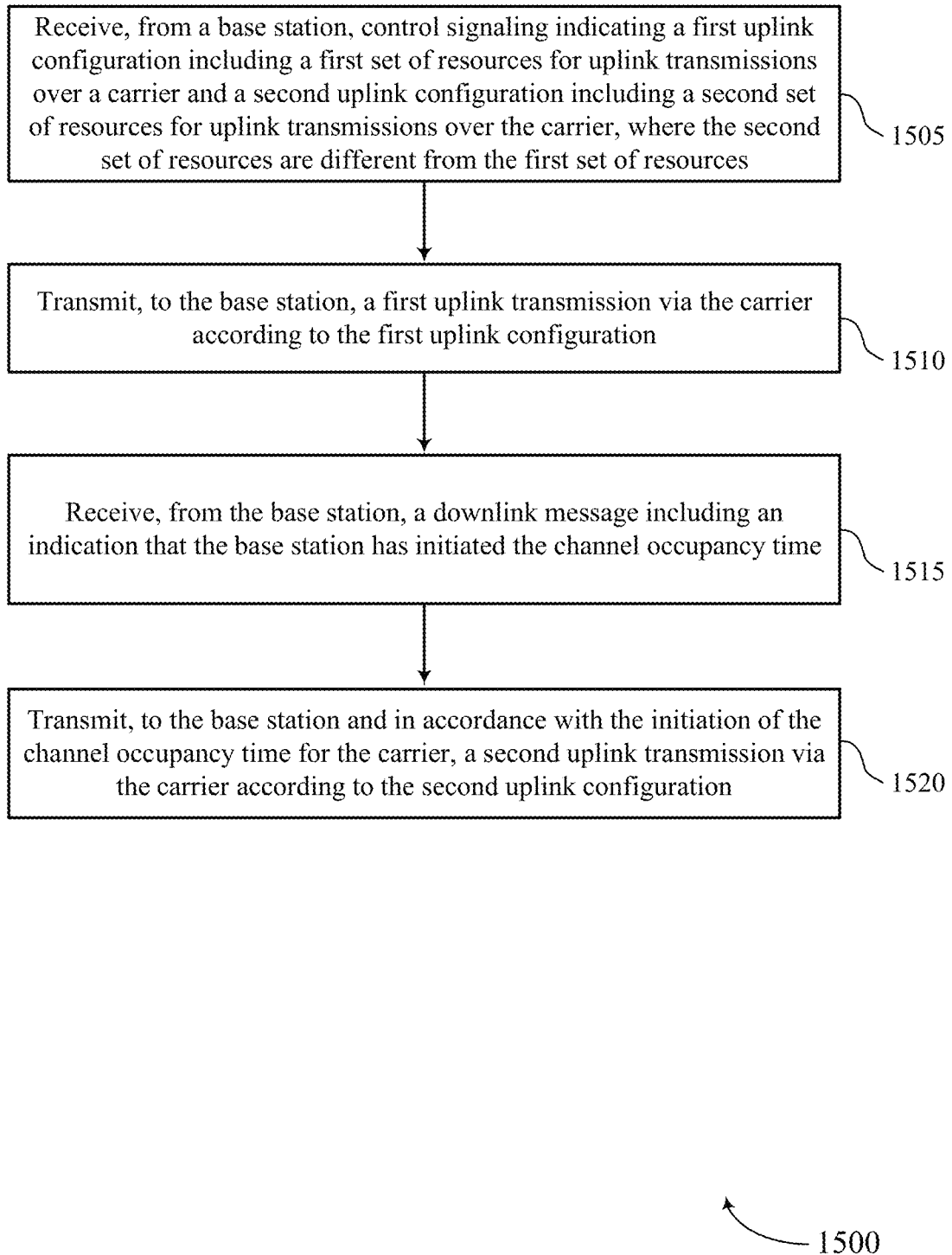

FIG. 15 shows a flowchart illustrating a method 1500 that supports techniques for dynamic switching of uplink configurations in accordance with aspects of the present disclosure. The operations of method 1500 may be implemented by a UE 115 or its components as described herein. In one aspect, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, control signaling indicating a first uplink configuration including a first set of resources for uplink transmissions over a carrier and a second uplink configuration including a second set of resources for uplink transmissions over the carrier, where the second set of resources are different from the first set of resources. The operations of 1505 may be performed according to the methods described herein. In some examples, aspects of the operations of 1505 may be performed by an uplink configuration manager as described with reference to FIGS. 5 through 8.

At 1510, the UE may transmit, to the base station, a first uplink transmission via the carrier according to the first uplink configuration. The operations of 1510 may be performed according to the methods described herein. In some examples, aspects of the operations of 1510 may be performed by an uplink transmission manager as described with reference to FIGS. 5 through 8.

At 1515, the UE may receive, from the base station, a downlink message including an indication that the base station has initiated the COT. The operations of 1515 may be performed according to the methods described herein. In some examples, aspects of the operations of 1515 may be performed by a downlink reception manager as described with reference to FIGS. 5 through 8.

At 1520, the UE may transmit, to the base station and based at least in part on the initiation of the COT for the carrier, a second uplink transmission via the carrier according to the second uplink configuration. The operations of 1520 may be performed according to the methods described herein. In some examples, aspects of the operations of 1520 may be performed by an uplink transmission manager as described with reference to FIGS. 5 through 8.

Figure 16:
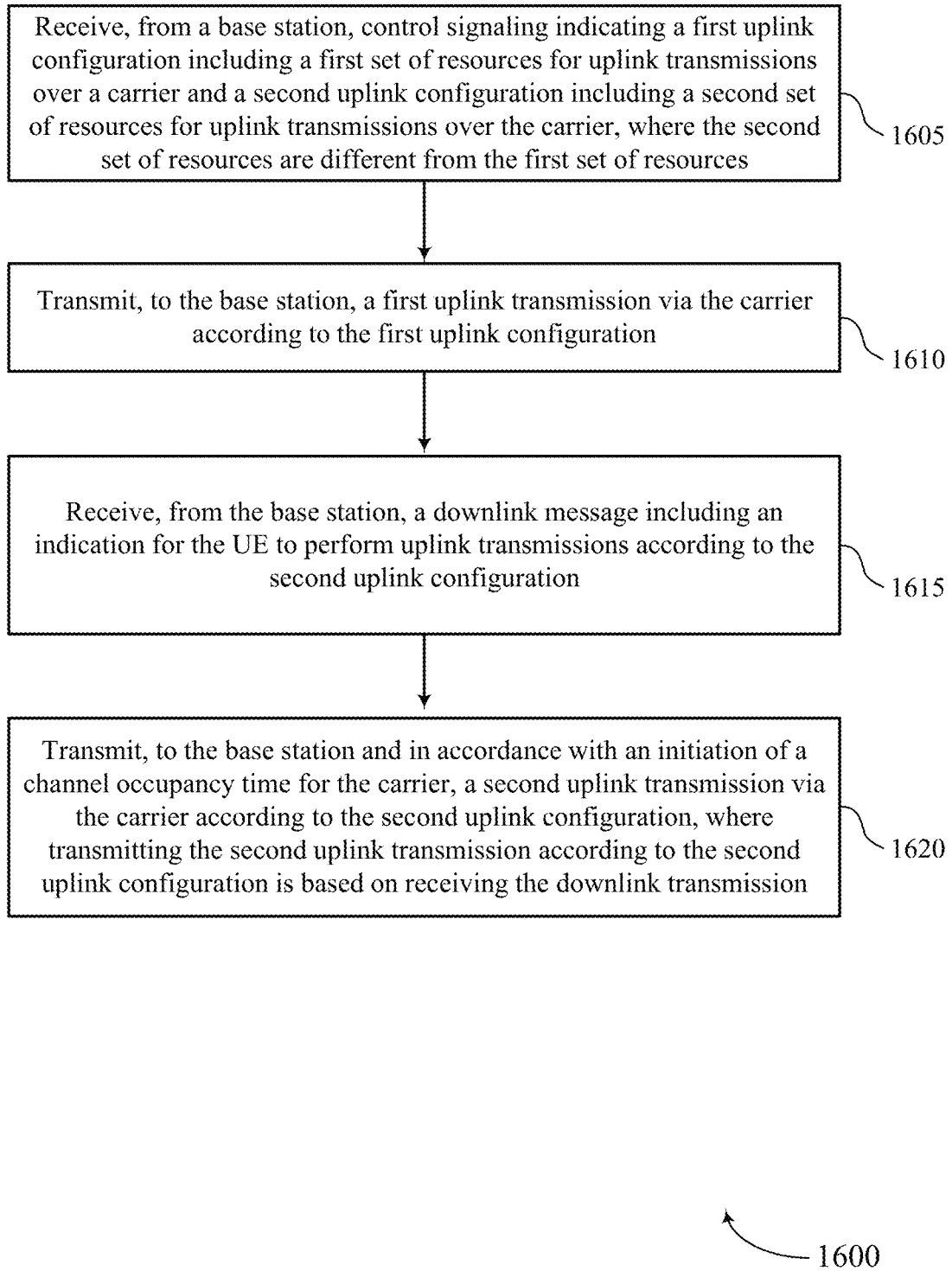

FIG. 16 shows a flowchart illustrating a method 1600 that supports techniques for dynamic switching of uplink configurations in accordance with aspects of the present disclosure. The operations of method 1600 may be implemented by a UE 115 or its components as described herein. In one aspect, the operations of method 1600 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, control signaling indicating a first uplink configuration including a first set of resources for uplink transmissions over a carrier and a second uplink configuration including a second set of resources for uplink transmissions over the carrier, where the second set of resources are different from the first set of resources. The operations of 1605 may be performed according to the methods described herein. In some examples, aspects of the operations of 1605 may be performed by an uplink configuration manager as described with reference to FIGS. 5 through 8.

At 1610, the UE may transmit, to the base station, a first uplink transmission via the carrier according to the first uplink configuration. The operations of 1610 may be performed according to the methods described herein. In some examples, aspects of the operations of 1610 may be performed by an uplink transmission manager as described with reference to FIGS. 5 through 8.

At 1615, the UE may receive, from the base station, a downlink message including an indication for the UE to perform uplink transmissions according to the second uplink configuration. The operations of 1615 may be performed according to the methods described herein. In some examples, aspects of the operations of 1615 may be performed by a downlink reception manager as described with reference to FIGS. 5 through 8.

At 1620, the UE may transmit, to the base station and based at least in part on an initiation of a channel occupancy time for the carrier, a second uplink transmission via the carrier according to the second uplink configuration, where transmitting the second uplink transmission according to the second uplink configuration is based on receiving the downlink message. The operations of 1620 may be performed according to the methods described herein. In some examples, aspects of the operations of 1620 may be performed by an uplink transmission manager as described with reference to FIGS. 5 through 8.

Figure 17:
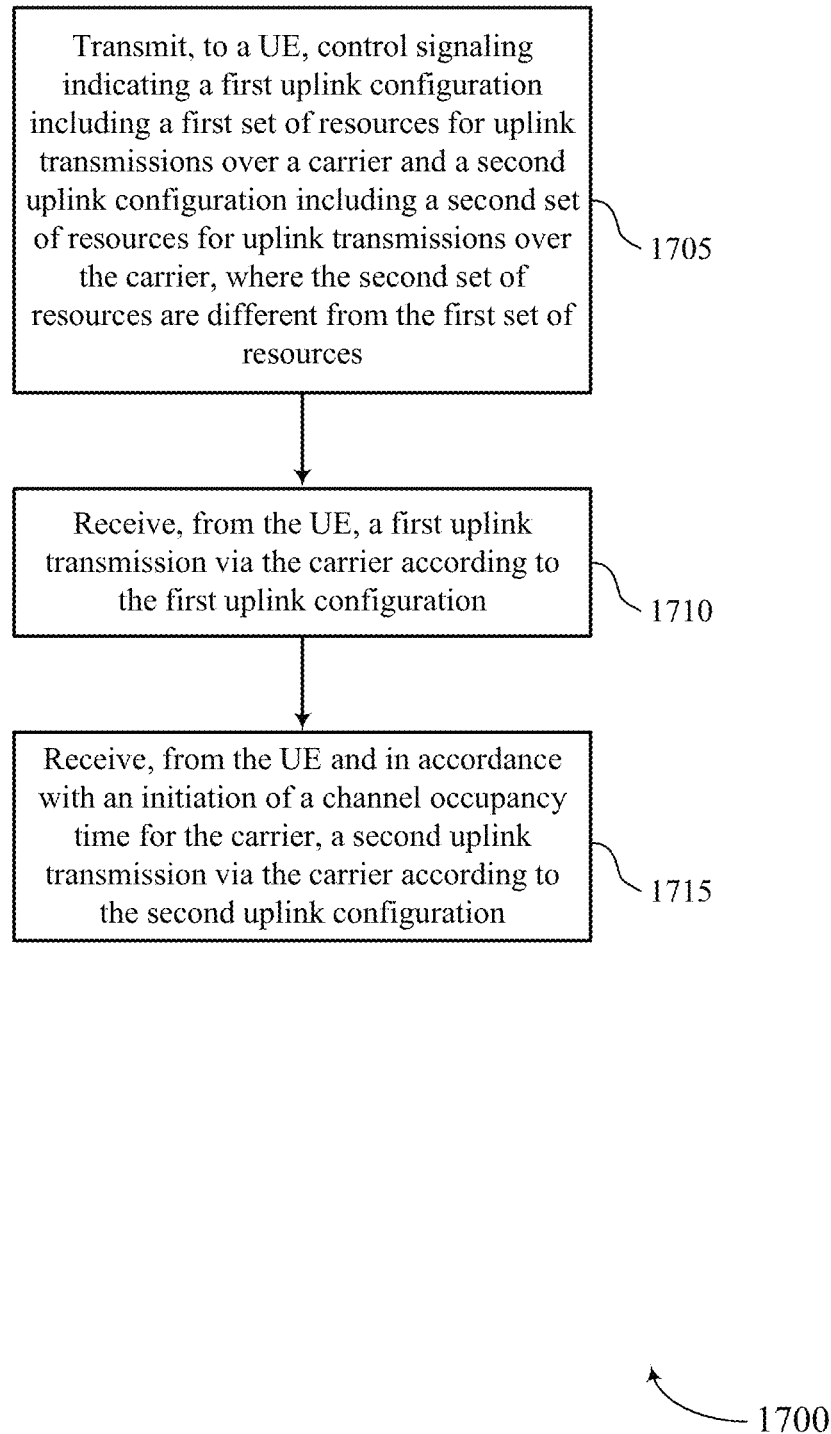

FIG. 17 shows a flowchart illustrating a method 1700 that supports techniques for dynamic switching of uplink configurations in accordance with aspects of the present disclosure. The operations of method 1700 may be implemented by a base station 105 or its components as described herein. In one aspect, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may transmit, to a UE, control signaling indicating a first uplink configuration including a first set of resources for uplink transmissions over a carrier and a second uplink configuration including a second set of resources for uplink transmissions over the carrier, where the second set of resources are different from the first set of resources. The operations of 1705 may be performed according to the methods described herein. In some examples, aspects of the operations of 1705 may be performed by an uplink configuration manager as described with reference to FIGS. 9 through 12.

At 1710, the base station may receive, from the UE, a first uplink transmission via the carrier according to the first uplink configuration. The operations of 1710 may be performed according to the methods described herein. In some examples, aspects of the operations of 1710 may be performed by an uplink reception manager as described with reference to FIGS. 9 through 12.

At 1715, the base station may receive, from the UE and based at least in part on an initiation of a COT for the carrier, a second uplink transmission via the carrier according to the second uplink configuration. The operations of 1715 may be performed according to the methods described herein. In some examples, aspects of the operations of 1715 may be performed by an uplink reception manager as described with reference to FIGS. 9 through 12.

The following provides an overview of aspects of the present disclosure:

Aspect 1: A method for wireless communication implemented by a UE, comprising: identifying a first uplink configuration comprising a first set of resources for uplink transmissions over a carrier and a second uplink configuration comprising a second set of resources for uplink transmissions over the carrier, wherein the second set of resources are different from the first set of resources; transmitting, to a base station, a first uplink transmission via the carrier according to the first uplink configuration; identifying an initiation of a COT for the carrier; and transmitting, to the base station, a second uplink transmission via the carrier according to the second uplink configuration.

Aspect 2: The method of aspect 1, further comprising: performing a channel access procedure for the carrier; and initiating the COT for the carrier based at least in part on performing the channel access procedure, wherein identifying the initiation of the COT is based at least in part on initiating the COT.

Aspect 3: The method of any of aspects 1 through 2, further comprising: receiving, from the base station, a downlink message comprising an indication that the base station has initiated the COT, wherein identifying the initiation of the COT is based at least in part on receiving the downlink message.

Aspect 4: The method of any of aspects 1 through 3, further comprising: receiving, from the base station, a downlink message comprising an indication for the UE to perform uplink transmissions according to the second uplink configuration, wherein transmitting the second uplink transmission according to the second uplink configuration is based at least in part on receiving the downlink message.

Aspect 5: The method of any of aspects 1 through 4, further comprising: receiving, from the base station, a RRC message indicating the first uplink configuration and the second uplink configuration, wherein identifying the first uplink configuration and the second uplink configuration is based at least in part on receiving the RRC message.

Aspect 6: The method of any of aspects 1 through 5, wherein the first set of resources comprise a first set of uplink transmission occasions for uplink transmissions, and the second set of resources comprise a second set of uplink transmission occasions for uplink transmissions.

Aspect 7: The method of aspect 6, wherein the first set of uplink transmission occasions are arranged according to a first periodicity, and the second set of uplink transmission occasions are arranged according to a second periodicity which is less than the first periodicity.

Aspect 8: The method of aspect 7, wherein the first set of uplink transmission occasions comprise two or more uplink transmission occasions per slot, and the second set of uplink transmission occasions comprise one or fewer uplink transmission occasions per slot.

Aspect 9: The method of any of aspects 1 through 8, further comprising: determining an indication to perform uplink transmissions according to the first uplink configuration after transmitting the second uplink transmission; and transmitting, to the base station, a third uplink transmission according to the first uplink configuration based at least in part on identifying the indication to perform uplink transmissions according to the first uplink configuration.

Aspect 10: The method of aspect 9, further comprising: identifying a termination of the COT for the carrier, wherein determining the indication to perform uplink transmissions according to the first uplink configuration is based at least in part on identifying the termination of the COT.

Aspect 11: The method of any of aspects 9 through 10, further comprising: identifying an expiration of a timer associated with the second uplink configuration, wherein determining the indication to perform uplink transmissions according to the first uplink configuration is based at least in part on identifying the expiration of the timer.

Aspect 12: The method of aspect 11, further comprising: identifying an initiation of the timer based at least in part on identifying the initiation of the COT, a downlink message received from the base station, or both, wherein identifying the expiration of the timer is based at least in part on identifying the initiation of the timer and a timer expiry time.

Aspect 13: The method of any of aspects 9 through 12, further comprising: receiving, from the base station, downlink control information indicating for the UE to perform uplink transmissions according to the first uplink configuration, wherein determining the indication to perform uplink transmissions according to the first uplink configuration is based at least in part on receiving the downlink control information.

Aspect 14: The method of any of aspects 9 through 13, further comprising: transmitting, to the base station, uplink control information indicating that the UE will perform subsequent uplink transmissions according to the first uplink configuration, wherein the third uplink transmission is transmitted based at least in part on transmitting the uplink control information.

Aspect 15: The method of any of aspects 9 through 14, further comprising: transmitting a first MAC-CE message, receiving a second MAC-CE message, or both, wherein the first MAC-CE message and the second MAC-CE message comprise an indication for the UE to perform subsequent uplink transmissions according to the first uplink configuration, wherein transmitting the third uplink transmission is based at least in part on transmitting the first MAC-CE message, receiving the second MAC-CE message, or both.

Aspect 16: The method of any of aspects 1 through 15, further comprising: transmitting, to the base station, a UE capability message comprising an indication that the UE supports dynamically switching between the first uplink configuration and the second uplink configuration; and receiving, from the base station, a RRC message indicating the first uplink configuration and the second uplink configuration based at least in part on the UE capability message.

Aspect 17: The method of any of aspects 1 through 16, wherein at least one of the first uplink transmission or the second uplink transmission comprises a scheduling request transmitted via a physical uplink control channel.

Aspect 18: The method of any of aspects 1 through 17, wherein at least one of the first uplink transmission or the second uplink transmission is transmitted according to a configured grant via a PUSCH.

Aspect 19: The method of any of aspects 1 through 18, wherein the carrier and the COT are associated with an unlicensed spectrum band.

Aspect 20: A method for wireless communication implemented by a base station, comprising: identifying a first uplink configuration comprising a first set of resources for uplink transmissions over a carrier and a second uplink configuration comprising a second set of resources for uplink transmissions over the carrier, wherein the second set of resources are different from the first set of resources; receiving, from a UE, a first uplink transmission via the carrier according to the first uplink configuration; identifying an initiation of a COT for the carrier; and receiving, from the UE, a second uplink transmission via the carrier according to the second uplink configuration.

Aspect 21: The method of aspect 20, further comprising: performing a channel access procedure for the carrier; and initiating the COT for the carrier based at least in part on performing the channel access procedure, wherein identifying the initiation of the COT is based at least in part on initiating the COT.

Aspect 22: The method of any of aspects 20 through 21, further comprising: receiving, from the UE, an indication that the UE has initiated the COT, wherein identifying the initiation of the COT is based at least in part on receiving the indication.

Aspect 23: The method of any of aspects 20 through 22, further comprising: transmitting, to the UE, a downlink message comprising an indication for the UE to perform uplink transmissions according to the second uplink configuration, wherein receiving the second uplink transmission according to the second uplink configuration is based at least in part on transmitting the downlink message.

Aspect 24: The method of any of aspects 20 through 23, further comprising: transmitting, to the UE, a RRC message indicating the first uplink configuration and the second uplink configuration based at least in part on identifying the first uplink configuration and the second uplink configuration.

Aspect 25: The method of any of aspects 20 through 24, wherein the first set of resources comprise a first set of uplink transmission occasions for uplink transmissions, and the second set of resources comprise a second set of uplink transmission occasions for uplink transmissions.

Aspect 26: The method of aspect 25, wherein the first set of uplink transmission occasions are arranged according to a first periodicity, and the second set of uplink transmission occasions are arranged according to a second periodicity which is less than the first periodicity.

Aspect 27: The method of aspect 26, wherein the first set of uplink transmission occasions comprise two or more uplink transmission occasions per slot, and the second set of uplink transmission occasions comprise one or fewer uplink transmission occasions per slot.

Aspect 28: The method of any of aspects 20 through 27, further comprising: determining an indication to receive uplink transmissions according to the first uplink configuration after transmitting the second uplink transmission; and receiving, from the UE, a third uplink transmission according to the first uplink configuration based at least in part on identifying the indication to receive uplink transmissions according to the first uplink configuration.

Aspect 29: The method of aspect 28, further comprising: identifying a termination of the COT for the carrier, wherein determining the indication to receive uplink transmissions according to the first uplink configuration is based at least in part on identifying the termination of the COT.

Aspect 30: The method of any of aspects 28 through 29, further comprising: identifying an expiration of a timer associated with the second uplink configuration, wherein determining the indication to receive uplink transmissions according to the first uplink configuration is based at least in part on identifying the expiration of the timer.

Aspect 31: The method of aspect 30, further comprising: identifying an initiation of the timer based at least in part on identifying the initiation of the COT, an uplink transmission received from the UE, or both, wherein identifying the expiration of the timer is based at least in part on identifying the initiation of the timer and a timer expiry time.

Aspect 32: The method of any of aspects 28 through 31, further comprising: transmitting, to the UE, downlink control information indicating for the UE to perform uplink transmissions according to the first uplink configuration based at least in part on determining the indication to receive uplink transmissions according to the first uplink configuration.

Aspect 33: The method of any of aspects 28 through 32, further comprising: receiving, from the UE, uplink control information indicating that the UE will perform subsequent uplink transmissions according to the first uplink configuration, wherein the third uplink transmission is received based at least in part on receiving the uplink control information.

Aspect 34: The method of any of aspects 28 through 33, further comprising: receiving a first MAC-CE message, transmitting a second MAC-CE message, or both, wherein the first MAC-CE message and the second MAC-CE message comprise an indication for the UE to perform subsequent uplink transmissions according to the first uplink configuration, wherein receiving the third uplink transmission is based at least in part on receiving the first MAC-CE message, transmitting the second MAC-CE message, or both.

Aspect 35: The method of any of aspects 20 through 34, further comprising: receiving, from the UE, a UE capability message comprising an indication that the UE supports dynamically switching between the first uplink configuration and the second uplink configuration; and transmitting, to the UE, a RRC message indicating the first uplink configuration and the second uplink configuration based at least in part on the UE capability message.

Aspect 36: The method of any of aspects 20 through 35, wherein at least one of the first uplink transmission or the second uplink transmission comprises a scheduling request transmitted via a physical uplink control channel.

Aspect 37: The method of any of aspects 20 through 36, wherein at least one of the first uplink transmission or the second uplink transmission is received according to a configured grant via a PUSCH.

Aspect 38: The method of any of aspects 20 through 37, wherein the carrier and the COT are associated with an unlicensed spectrum band.

Aspect 39: An apparatus for wireless communication implemented by a UE, comprising a processor; memory coupled with the processor; and instructions stored in the memory and executable by the processor to cause the apparatus to perform a method of any of aspects 1 through 19.

Aspect 40: An apparatus for wireless communication implemented by a UE, comprising at least one means for performing a method of any of aspects 1 through 19.

Aspect 41: A non-transitory computer-readable medium storing code for wireless communication implemented by a UE, the code comprising instructions executable by a processor to perform a method of any of aspects 1 through 19.

Aspect 42: An apparatus for wireless communication implemented by a base station, comprising a processor; memory coupled with the processor; and instructions stored in the memory and executable by the processor to cause the apparatus to perform a method of any of aspects 20 through 38.

Aspect 43: An apparatus for wireless communication implemented by a base station, comprising at least one means for performing a method of any of aspects 20 through 38.

Aspect 44: A non-transitory computer-readable medium storing code for wireless communication implemented by a base station, the code comprising instructions executable by a processor to perform a method of any of aspects 20 through 38.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. In one aspect, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. In one aspect, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. In one aspect, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. In one aspect, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication implemented by a user equipment (UE), comprising:
  receiving, from a base station, control signaling indicating a first uplink configuration comprising a first set of resources for uplink transmissions over a carrier and a second uplink configuration comprising a second set of resources for uplink transmissions over the carrier, wherein the second set of resources are different from the first set of resources, and wherein the first set of resources comprise a first set of uplink transmission occasions for uplink transmissions, and the second set of resources comprise a second set of uplink transmission occasions for uplink transmissions, wherein the first set of uplink transmission occasions are arranged according to a first periodicity, and the second set of uplink transmission occasions are arranged according to a second periodicity which is less than the first periodicity;
  transmitting, to the base station, a first uplink transmission via the carrier according to the first uplink configuration; and
  transmitting, to the base station based at least in part on an initiation of a channel occupancy time for the carrier, a second uplink transmission via the carrier according to the second uplink configuration.

2. The method of claim 1, further comprising:
  performing a channel access procedure for the carrier; and
  initiating the channel occupancy time for the carrier based at least in part on performing the channel access procedure.

3. The method of claim 1, further comprising:
  receiving, from the base station, a downlink message comprising an indication that the base station has initiated the channel occupancy time.

4. The method of claim 1, further comprising:
  receiving, from the base station, a downlink message comprising an indication for the UE to perform uplink transmissions according to the second uplink configuration, wherein the transmitting the second uplink transmission according to the second uplink configuration is based at least in part on receiving the downlink message.

5. The method of claim 1, further comprising:
  transmitting, to the base station, a UE capability message comprising an indication that the UE supports dynamically switching between the first uplink configuration and the second uplink configuration; and
  receiving, from the base station, a radio resource control message indicating the first uplink configuration and the second uplink configuration based at least in part on the UE capability message.

6. The method of claim 1, wherein the first uplink transmission, the second uplink transmission, or both, comprise a scheduling request transmitted via a physical uplink control channel.

7. The method of claim 1, wherein the first uplink transmission, the second uplink transmission, or both, are transmitted according to a configured grant via a physical uplink shared channel.

8. The method of claim 1, wherein the carrier and the channel occupancy time are associated with an unlicensed spectrum band.

9. A method for wireless communication implemented by a user equipment (UE), comprising:
  receiving, from a base station, control signaling indicating a first uplink configuration comprising a first set of resources for uplink transmissions over a carrier and a second uplink configuration comprising a second set of resources for uplink transmissions over the carrier, wherein the second set of resources are different from the first set of resources;
  transmitting, to the base station, a first uplink transmission via the carrier according to the first uplink configuration;
  transmitting, to the base station based at least in part on an initiation of a channel occupancy time for the carrier, a second uplink transmission via the carrier according to the second uplink configuration;
  determining an indication to perform uplink transmissions according to the first uplink configuration after transmitting the second uplink transmission, wherein the determining is based at least in part on a termination of the channel occupancy time for the carrier, an expiration of a timer associated with the second uplink configuration, additional control signaling received from the base station, or any combination thereof; and
  transmitting, to the base station, a third uplink transmission according to the first uplink configuration based at least in part on identifying the indication to perform uplink transmissions according to the first uplink configuration.

10. The method of claim 9, further comprising:
  transmitting, to the base station, uplink control information indicating that the UE will perform subsequent uplink transmissions according to the first uplink configuration, wherein the third uplink transmission is transmitted based at least in part on transmitting the uplink control information.

11. The method of claim 9, further comprising:
  transmitting a first MAC-CE message, receiving a second MAC-CE message, or both, wherein the first MAC-CE message and the second MAC-CE message comprise an indication for the UE to perform subsequent uplink transmissions according to the first uplink configuration, wherein the transmitting the third uplink transmission is based at least in part on transmitting the first MAC-CE message, receiving the second MAC-CE message, or both.

12. A method for wireless communication implemented by a base station, comprising:
  transmitting, to a user equipment (UE), a first uplink configuration comprising a first set of resources for uplink transmissions over a carrier and a second uplink configuration comprising a second set of resources for uplink transmissions over the carrier, wherein the second set of resources are different from the first set of resources, and wherein the first set of resources comprise a first set of uplink transmission occasions for uplink transmissions, and the second set of resources comprise a second set of uplink transmission occasions for uplink transmissions, wherein the first set of uplink transmission occasions are arranged according to a first periodicity, and the second set of uplink transmission occasions are arranged according to a second periodicity which is less than the first periodicity;

receiving, from the UE, a first uplink transmission via the carrier according to the first uplink configuration; and receiving, from the UE and based at least in part on an initiation of a channel occupancy time for the carrier, a second uplink transmission via the carrier according to the second uplink configuration.

13. The method of claim 12, further comprising:
performing a channel access procedure for the carrier; and
initiating the channel occupancy time for the carrier based at least in part on performing the channel access procedure.

14. The method of claim 12, further comprising:
receiving, from the UE, an indication that the UE has initiated the channel occupancy time.

15. The method of claim 12, further comprising:
transmitting, to the UE, a downlink message comprising an indication for the UE to perform uplink transmissions according to the second uplink configuration, wherein the receiving the second uplink transmission according to the second uplink configuration is based at least in part on transmitting the downlink message.

16. A method for wireless communication implemented by a base station, comprising:
transmitting, to a user equipment (UE), a first uplink configuration comprising a first set of resources for uplink transmissions over a carrier and a second uplink configuration comprising a second set of resources for uplink transmissions over the carrier, wherein the second set of resources are different from the first set of resources;

receiving, from the UE, a first uplink transmission via the carrier according to the first uplink configuration;

receiving, from the UE and based at least in part on an initiation of a channel occupancy time for the carrier, a second uplink transmission via the carrier according to the second uplink configuration;

determining an indication to receive uplink transmissions according to the first uplink configuration after transmitting the second uplink transmission, wherein the determining is based at least in part on a termination of the channel occupancy time for the carrier, an expiration of a timer associated with the second uplink configuration, an uplink message received from the UE, or any combination thereof; and receiving, from the UE, a third uplink transmission according to the first uplink configuration based at least in part on identifying the indication to receive uplink transmissions according to the first uplink configuration.

17. The method of claim 16, further comprising:
receiving, from the UE, uplink control information indicating that the UE will perform subsequent uplink transmissions according to the first uplink configuration, wherein the third uplink transmission is received based at least in part on receiving the uplink control information.

18. The method of claim 16, further comprising:
receiving a first MAC-CE message, transmitting a second MAC-CE message, or both, wherein the first MAC-CE message and the second MAC-CE message comprise an indication for the UE to perform subsequent uplink transmissions according to the first uplink configuration, wherein the receiving the third uplink transmission is based at least in part on receiving the first MAC-CE message, transmitting the second MAC-CE message, or both.

19. The method of claim 12, further comprising:
receiving, from the UE, a UE capability message comprising an indication that the UE supports dynamically switching between the first uplink configuration and the second uplink configuration; and transmitting, to the UE, a radio resource control message indicating the first uplink configuration and the second uplink configuration based at least in part on the UE capability message.

20. An apparatus for wireless communication at a user equipment (UE), comprising:
a processor; and
memory coupled with the processor, wherein the memory comprises instructions executable by the processor to cause the apparatus to:
receive, from a base station, control signaling indicating a first uplink configuration comprising a first set of resources for uplink transmissions over a carrier and a second uplink configuration comprising a second set of resources for uplink transmissions over the carrier, wherein the second set of resources are different from the first set of resources, and wherein the first set of resources comprise a first set of uplink transmission occasions for uplink transmissions, and the second set of resources comprise a second set of uplink transmission occasions for uplink transmissions, wherein the first set of uplink transmission occasions are arranged according to a first periodicity, and the second set of uplink transmission occasions are arranged according to a second periodicity which is less than the first periodicity;

transmit, to the base station, a first uplink transmission via the carrier according to the first uplink configuration; and transmit, to the base station and based at least in part on an initiation of a channel occupancy time for the carrier, a second uplink transmission via the carrier according to the second uplink configuration.

21. The apparatus of claim 20, wherein the instructions are further executable by the processor to cause the apparatus to:
perform a channel access procedure for the carrier; and
initiate the channel occupancy time for the carrier based at least in part on performing the channel access procedure.

22. The apparatus of claim 20, wherein the instructions are further executable by the processor to cause the apparatus to:
receive, from the base station, a downlink message comprising an indication that the base station has initiated the channel occupancy time.

23. The apparatus of claim 20, wherein the instructions are further executable by the processor to cause the apparatus to:
receive, from the base station, a downlink message comprising an indication for the UE to perform uplink transmissions according to the second uplink configuration, wherein the transmitting the second uplink transmission according to the second uplink configuration is based at least in part on receiving the downlink message.

24. An apparatus for wireless communication at a base station, comprising:
a processor; and
memory coupled with the processor, wherein the memory comprises instructions executable by the processor to cause the apparatus to:
transmit, to a user equipment (UE), a first uplink configuration comprising a first set of resources for uplink transmissions over a carrier and a second uplink configuration comprising a second set of resources for uplink transmissions over the carrier, wherein the second set of resources are different from the first set of resources and wherein the first set of resources comprise a first set of uplink transmission occasions for uplink transmissions, and the second set of resources comprise a second set of uplink transmission occasions for uplink transmissions, wherein the first set of uplink transmission occasions are arranged according to a first periodicity, and the second set of uplink transmission occasions are arranged according to a second periodicity which is less than the first periodicity;
receive, from the UE, a first uplink transmission via the carrier according to the first uplink configuration; and
receive, from the UE and based at least in part on an initiation of a channel occupancy time for the carrier, a second uplink transmission via the carrier according to the second uplink configuration.

25. The apparatus of claim 24, wherein the instructions are further executable by the processor to cause the apparatus to:
perform a channel access procedure for the carrier; and
initiate the channel occupancy time for the carrier based at least in part on performing the channel access procedure.

26. The apparatus of claim 24, wherein the instructions are further executable by the processor to cause the apparatus to:
receive, from the UE, an indication that the UE has initiated the channel occupancy time.

27. The apparatus of claim 24, wherein the instructions are further executable by the processor to cause the apparatus to:
transmit, to the UE, a downlink message comprising an indication for the UE to perform uplink transmissions according to the second uplink configuration, wherein the receiving the second uplink transmission according to the second uplink configuration is based at least in part on transmitting the downlink message.

28. An apparatus for wireless communication at a base station, comprising:
a processor; and
memory coupled with the processor, wherein the memory comprises instructions executable by the processor to cause the apparatus to:
transmit, to a user equipment (UE), a first uplink configuration comprising a first set of resources for uplink transmissions over a carrier and a second uplink configuration comprising a second set of resources for uplink transmissions over the carrier, wherein the second set of resources are different from the first set of resources;
receive, from the UE, a first uplink transmission via the carrier according to the first uplink configuration;
receive, from the UE and based at least in part on an initiation of a channel occupancy time for the carrier, a second uplink transmission via the carrier according to the second uplink configuration;
determine an indication to receive uplink transmissions according to the first uplink configuration after transmitting the second uplink transmission, wherein the determining is based at least in part on a termination of the channel occupancy time for the carrier, an expiration of a timer associated with the second uplink configuration, an uplink message received from the UE, or any combination thereof; and
receive, from the UE, a third uplink transmission according to the first uplink configuration based at least in part on identifying the indication to receive uplink transmissions according to the first uplink configuration.

29. The apparatus of claim 28, wherein the instructions are further executable by the processor to cause the apparatus to:
receive, from the UE, uplink control information indicating that the UE will perform subsequent uplink transmissions according to the first uplink configuration, wherein the third uplink transmission is received based at least in part on receiving the uplink control information.

30. The apparatus of claim 28, wherein the instructions are further executable by the processor to cause the apparatus to:
receive a first MAC-CE message, transmitting a second MAC-CE message, or both, wherein the first MAC-CE message and the second MAC-CE message comprise an indication for the UE to perform subsequent uplink transmissions according to the first uplink configuration, wherein the receiving the third uplink transmission is based at least in part on receiving the first MAC-CE message, transmitting the second MAC-CE message, or both.

* * * * *